United States Patent
Nishiyasu et al.

(10) Patent No.: US 11,589,275 B2
(45) Date of Patent: Feb. 21, 2023

(54) WIRELESS COMMUNICATION SYSTEM, CONTROL DEVICE, ACCESS POINT, AND TERMINAL DEVICE

(71) Applicant: Panasonic Intellectual Property Management Co., Ltd., Osaka (JP)

(72) Inventors: Kazuma Nishiyasu, Osaka (JP); Naganori Shirakata, Kanagawa (JP); Junichi Morita, Tokyo (JP); Hiroshi Takahashi, Kanagawa (JP); Mei Okamoto, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 196 days.

(21) Appl. No.: 17/013,894

(22) Filed: Sep. 8, 2020

(65) Prior Publication Data

US 2020/0404554 A1 Dec. 24, 2020

Related U.S. Application Data

(63) Continuation of application No. PCT/JP2019/005591, filed on Feb. 15, 2019.

(30) Foreign Application Priority Data

Mar. 16, 2018 (JP) .............................. JP2018-049911

(51) Int. Cl.
*H04W 36/00* (2009.01)
*H04W 72/04* (2009.01)
(Continued)

(52) U.S. Cl.
CPC ... *H04W 36/0072* (2013.01); *H04W 36/0016* (2013.01); *H04W 72/0446* (2013.01); *H04W 74/02* (2013.01)

(58) Field of Classification Search
CPC ......... H04W 36/0072; H04W 36/0016; H04W 72/0446; H04W 74/02
See application file for complete search history.

(56) References Cited

U.S. PATENT DOCUMENTS 9,980,281 B2 * 5/2018 Kim .................... H04W 72/042
2010/0284355 A1 11/2010 Jung et al.
(Continued)

FOREIGN PATENT DOCUMENTS

JP 2006-319444 A 11/2006
JP 2008-510380 4/2008
(Continued)

OTHER PUBLICATIONS

International Search Report of PCT application No. PCT/JP2019/005591 dated May 7, 2019.

*Primary Examiner* — Michael Thier
*Assistant Examiner* — Nevena Zecevic Sandhu
(74) *Attorney, Agent, or Firm* — Seed IP Law Group LLP

(57) ABSTRACT

A terminal device includes: transmission circuitry that transmits a connection request to a first access point in order to connect, by a wireless link, to one of the first access point or a second access point each having a superframe in an initial state in which a control channel period is longer than a data channel period; and reception circuitry that receives, as a connection response, information indicating the second access point as information on a connection destination access point from the first access point after the connection request is transmitted.

10 Claims, 15 Drawing Sheets

(51) Int. Cl.
*H04W 74/02* (2009.01)
*H04W 72/0446* (2023.01)

(56) References Cited

U.S. PATENT DOCUMENTS

| | | | |
|---|---|---|---|
| 2013/0241432 | A1 | 9/2013 | Ebihara et al. |
| 2017/0135001 | A1* | 5/2017 | Kim ................... H04L 5/0055 |
| 2018/0184432 | A1* | 6/2018 | Ryoo ................... H04W 88/08 |
| 2018/0255472 | A1* | 9/2018 | Chendamarai Kannan ............... H04W 72/1289 |
| 2019/0159238 | A1* | 5/2019 | Kim ................... H04L 1/1812 |
| 2020/0008027 | A1* | 1/2020 | Yabuuchi ......... G08G 1/096725 |

FOREIGN PATENT DOCUMENTS

| | | |
|---|---|---|
| JP | 2012-513168 | 6/2012 |
| JP | 2013-191357 | 9/2013 |
| JP | 2014-175926 | 9/2014 |
| WO | 2006/020520 | 2/2006 |
| WO | 2009/075518 | 6/2009 |
| WO | 2010/080362 | 7/2010 |

* cited by examiner

FIG. 6

| CONNECTION REQUEST RECEPTION AP | SLAVE UNIT BIAS | PHASE 1 | PHASE 2 | PHASE 3 | PHASE 4 |
|---|---|---|---|---|---|
| CONTROL CHANNEL PRIORITY MODE AP | PRESENT | DATA CHANNEL | DATA CHANNEL | CONTROL CHANNEL | DATA CHANNEL |
| | ABSENT | | | | CONTROL CHANNEL |
| DATA CHANNEL PRIORITY MODE AP | PRESENT | DATA CHANNEL | DATA CHANNEL | DATA CHANNEL | CONTROL CHANNEL |
| | ABSENT | | | CONTROL CHANNEL | DATA CHANNEL |

FIG. 15

| | NUMBER | INITIAL ALLOCATION | CONNECTION PROCESSING OF SLAVE UNIT | AT TIME OF ALLOCATION CHANGE |
|---|---|---|---|---|
| CONTROL DEVICE 10 | SEVERAL TENS TO SEVERAL HUNDREDS | CONTROL CHANNEL | CONNECT TO DESIGNATED AP | HANDOVER OCCURS |
| CONTROL DEVICE 10A | SEVERAL THOUSANDS TO SEVERAL TENS OF THOUSANDS | CONTROL CHANNEL & DATA CHANNEL | CONNECT TO TRANSMISSION DESTINATION AP OF CONNECTION RESPONSE | NO HANDOVER OCCURS |

WIRELESS COMMUNICATION SYSTEM, CONTROL DEVICE, ACCESS POINT, AND TERMINAL DEVICE

CROSS REFERENCE TO RELATED APPLICATIONS

This application is a continuation of PCT International Application No. PCT/JP2019/005591, filed on Feb. 15, 2019, which claims the benefit of foreign priority of Japanese patent application 2018-049911 filed on Mar. 16, 2018, the contents all of which are incorporated herein by reference.

BACKGROUND

1. Technical Field

The present disclosure relates to a wireless communication system, a control device, an access point, and a terminal device.

2. Background Art

In recent years, for example, in a facility that can accommodate a large number of spectators, such as a stadium or a hall, there may be provided a performance such as display of characters, pictures, figures, and/or color changes by controlling a light-emitting state of a mass of light-emitting devices carried by the spectators (hereinafter occasionally referred to as "slave units" and "terminal devices"). Slave units are carried by spectators in a form of, for example, a penlight, a bracelet, or a bangle applicable to wireless control (for example, Unexamined Japanese Patent Publication No. 2014-175926).

SUMMARY

The slave unit is wirelessly connected to, for example, an access point (AP), and the light-emitting state is wirelessly controlled via the AP. For example, a random access channel (RACH) can be used for an initial connection of the slave unit to the AP.

When an allocation amount of a control channel and a data channel in the AP is dynamically changed depending on a congestion degree of RACH, a connection destination AP of the slave unit can be changed to another AP. When the connection destination AP of the slave unit is changed to the other AP, handover processing of the slave unit between the APs occurs.

Unexamined Japanese Patent Publication No. 2014-175926 insufficiently examines the occurrence of handover processing between APs in multiple slave units that are wirelessly controlled in a mass performance (display of light emission patterns by a plurality of terminals).

A non-limiting example of the present disclosure contributes to the provision of a technique capable of achieving efficient connection processing for an access point of a terminal device.

A wireless communication system according to one aspect of the present disclosure includes: a first access point and a second access point each having a superframe in an initial state in which a control channel period is longer than a data channel period; one or more terminal devices, at least one of the one or more terminal devices transmitting a connection request to the first access point in order to connect with one of the first access point or the second access point by a wireless link; and a control device that performs control to cause the first access point to transmit, as a connection response, information indicating the second access point as information on a connection destination access point to the at least one of the one or more terminal devices that has transmitted the connection request.

Note that these comprehensive or specific aspects may be achieved by a system, a method, an integrated circuit, a computer program, or a recording medium, or by a combination of any of a system, an apparatus, a method, an integrated circuit, a computer program, and a recording medium.

One aspect of the present disclosure allows the connection processing to be efficiently performed for the access point of the terminal device.

Further advantages and effects of one aspect of the present disclosure will be apparent from the specification and drawings. Such advantages and/or effects are provided by some exemplary embodiments and the characteristics described in the specification and drawings, respectively, but all the advantages and/or effects do not have to be provided to obtain one or more of the same characteristics.

BRIEF DESCRIPTION OF DRAWINGS

FIG. 6 is a diagram showing one example of determination of a connection destination AP by a control device according to the exemplary embodiment;

FIG. 15 is a diagram comparing differences between the exemplary embodiment and the comparative example of FIG. 14.

DETAILED DESCRIPTION OF PREFERRED EMBODIMENTS

Hereinafter, an exemplary embodiment of the present disclosure will be described in detail with reference to the drawings as appropriate. However, an unnecessarily detailed description may be omitted. For example, a detailed description of a well-known item or a redundant description of substantially the same configuration may be omitted. Such an omission of description is to prevent the following description from being unnecessarily redundant and to facilitate understanding by those skilled in the art.

Note that the attached drawings and the following description are provided for those skilled in the art to fully understand the present disclosure, and are not intended to limit the subject matter as described in the appended claims by the attached drawings and the following description.

<Mass Performance by Slave Units and Connection Processing Between Slave Units and AP>

When providing a performance with a mass of wireless control compatible light-emitting devices (slave units or terminal devices), a light-emitting state (or light emission pattern) of the slave units is controlled by, for example, wireless communication via an access point (AP). By individually wirelessly controlling the light-emitting state of multiple slave units, a mass performance such as display of characters, pictures, and/or color changes is provided. Note that a sound output from the slave units and a vibration by the slave units may be further used for the mass performance.

In such a mass performance, the AP performs connection processing with, for example, thousands to tens of thousands of slave units. For example, when a specific low power radio is applied to a wireless communication method between the slave units and the AP, CSMA/CA is used as a wireless access method between the slave units and the AP. "CSMA/CA" is an abbreviation for "carrier sense multiple access/ collision avoidance".

In CSMA/CA in which communication traffic is likely to collide, a throughput can be reduced when multiple slave units exist in a coverage of the AP as in the case of a mass performance. Thus, how to efficiently connect multiple slave units to the AP is studied.

Further, in the AP, for example, communication with a slave unit requesting a connection to the AP and communication with a slave unit where connection has been established (for example, transmission of performance control information from the AP to the slave unit and/or transmission of sensor information from the slave unit to the AP) can be mixed. Thus, efficiency improvement of control for allocating radio resources to mixed communication in the AP (scheduling) is considered.

Example of Configuration of Wireless Communication System

Figure 1:
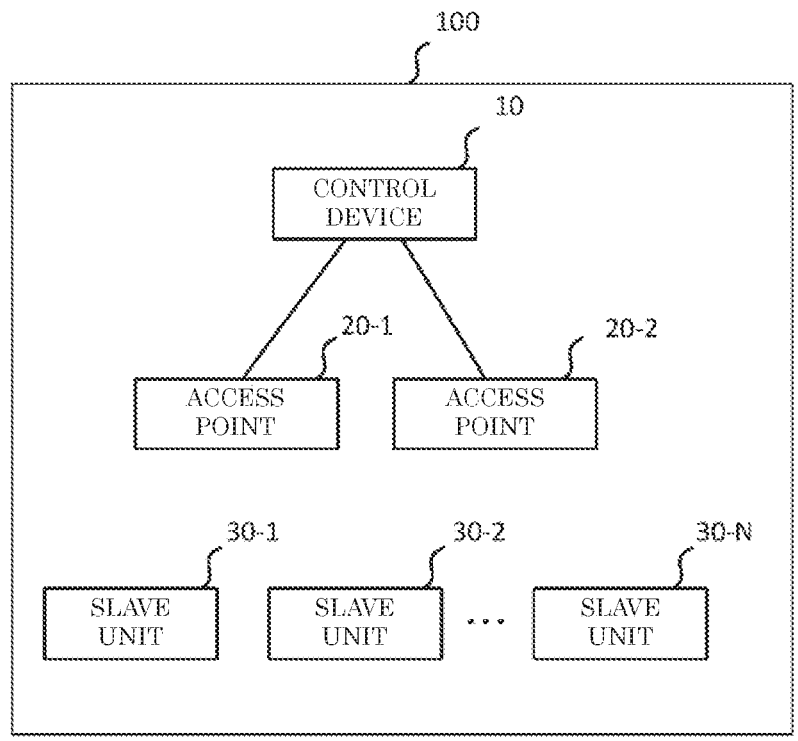
FIG. 1 is a diagram showing one example of a configuration of a wireless communication system according to an exemplary embodiment.

FIG. 1 is a diagram showing one example of a configuration of wireless communication system 100 according to the present exemplary embodiment.

Wireless communication system 100 may include, for example, control device 10, a plurality of access points (APs) 20-1 to 20-2, a plurality of slave units 30-1 to 30-N (N is an integer of 1 or more). FIG. 1 exemplarily shows two APs 20-1 and 20-2 and N slave units 30-1 to 30-N.

Hereinafter, when APs 20-1, 20-2 are not distinguished from each other, the APs may be referred to as "AP 20". Similarly, when slave units 30-1 to 30-N are not distinguished from each other, the slave units may be referred to as "slave unit 30".

Slave unit 30 is one example of a wireless control compatible light-emitting device. Slave unit 30 may be regarded as one example of a wireless device having a light-emitting circuit of a light emitting diode (LED), for example.

When a performance is provided by a mass of slave units 30 carried by spectators in a facility that can accommodate a large number of spectators, such as a stadium or a hall, a number of slave units 30 is from several thousands to tens of thousands, as one non-limiting example. Wireless communication system 100 that provides a performance using the plurality of slave units 30 may be referred to as "performance system 100".

Control device 10 controls an operation of wireless communication system 100, for example. Control device 10 may be, for example, a server computer or a personal computer (PC).

Control device 10 is connected to a plurality of APs 20 via a network such as a wired local area network (LAN), for example. The plurality of APs 20 and the plurality of slave units 30 are wirelessly connected, for example.

In the following description, the notation of "unit" used for constituent elements of control device 10, AP 20, and slave unit 30 is may be replaced with other notations such as "circuitry", "device", or "module".

Example of Configuration of Control Device

Figure 2:
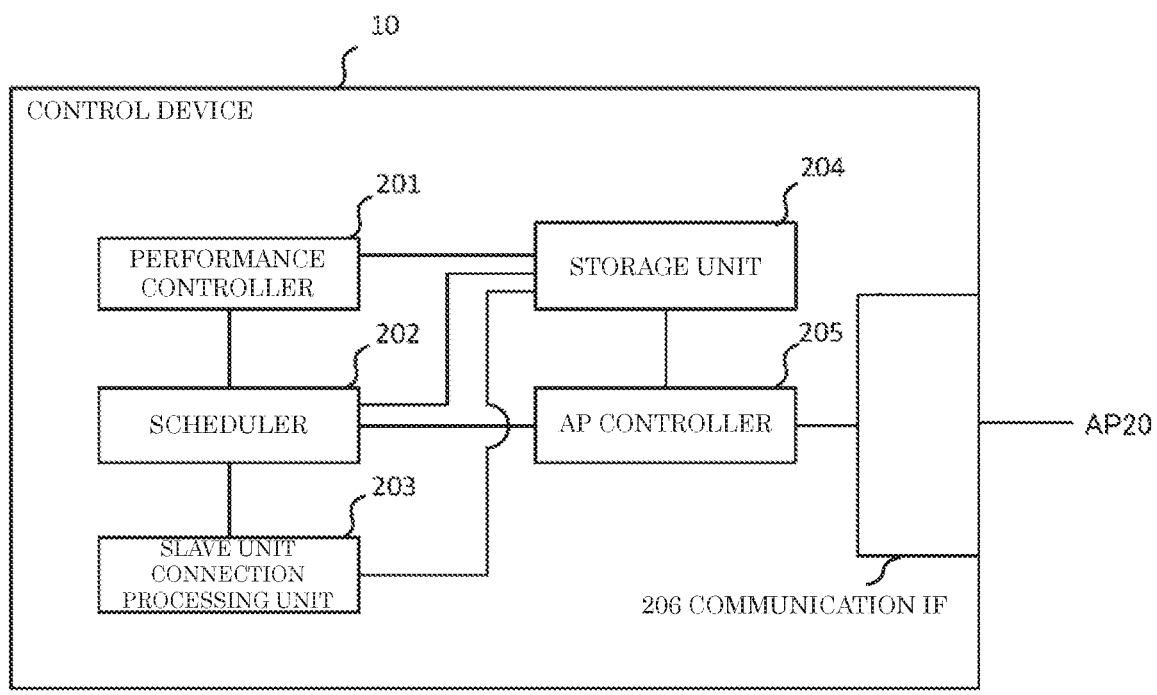
FIG. 2 is a block diagram showing one example of a configuration of a control device according to the exemplary embodiment.

FIG. 2 is a block diagram showing one example of a configuration of control device 10 according to the present exemplary embodiment.

Control device 10 may include, for example, performance control unit 201, scheduler 202, slave unit connection processing unit 203, storage unit 204, AP controller 205, and communication interface (IF) 206.

Performance controller 201 controls the performance by the plurality of slave units 30 via one of the plurality of APs 20. Examples of the performance control provided by performance controller 201 include control of the light-emitting state of a light-emitting circuit (for example, an LED) included in each of slave units 30 and/or control of an actuator such as a vibration motor.

Scheduler 202, for example, schedules a radio resource that APs 20 allocate to a radio link with slave units 30 based on the number of connected slave units managed by slave unit connection processing unit 203.

The "number of connected slave units" may be read as, for example, "number of accommodated slave units". The "number of connected slave units" or "number of accommodated slave units" may be regarded as the number of slave units 30 that time-divisionally share the radio link managed by each AP 20, for example.

For example, a control channel period used for control communication and a data channel period used for data communication may be time-division multiplexed in the radio link. Thus, in the radio link, a data channel transmission or reception is performed in a period different from a period of a control channel transmission or reception. The "channel period" time-division multiplexed in the radio link is one example of a time resource allocated to the radio link. The "channel period" may be read as "channel region".

Further, scheduler 202 notifies AP 20 connected with slave units 30 that have allocated the radio resources of scheduling information (in other words, resource allocation information) as a scheduling result. One example of the operation of scheduler 202 will be described later.

Slave unit connection processing unit 203 receives, for example, a connection request transmitted by any one of slave units 30 via any one of APs 20. When the connection request is received, slave unit connection processing unit 203 determines to which AP 20 slave units 30 as a transmission source of the connection request should be connected based on, for example, a phase that scheduler 202 determines based on the number of connected slave units.

Further, slave unit connection processing unit 203 transmits a connection response to slave units 30 as the transmission source of the connection request via AP 20 accessed by slave units 30 that has transmitted the connection request. One example of the operation of slave unit connection processing unit 203 and one example of the "phase" will be described later. The transmission and reception of the connection request and the connection response may be regarded as one example of communication using the control channel (hereinafter occasionally referred to as "control communication").

Storage unit 204 is a computer-readable recording medium, and stores, for example, performance information, slave unit information, and/or data obtained from any of slave units 30. Storage unit 204 may be exemplarily configured by using at least one of an optical disk such as a CD-ROM, a hard disk drive, a flexible disk, a magneto-optical disk (for example, a compact disk, a digital versatile disk, or a Blu-ray (registered trademark) disk), a smart card, a flash memory (for example, a card, a stick, or a key drive), or a magnetic strip.

The performance information is information used for performance by the mass of slave units 30, and is, for example, video data. A visual performance is provided by controlling the light-emitting state of the plurality of slave units 30 based on the video data. The slave unit information is information on slave units 30, and is, for example, identification information of slave units 30 and/or information of connection destination AP 20 of slave units 30 (connection destination AP information).

AP controller 205 determines, for example, an operation mode of AP 20 and a frequency (channel) used by AP 20. The operation mode determined by AP controller 205 may include, for example, a "control channel priority mode" and a "data channel priority mode".

The "control channel priority mode" is a mode in which control of a wireless network such as a connection protocol is prioritized.

The "data channel priority mode" is a mode that prioritizes transmission and reception of data having higher priority (for example, an allowable delay amount) than data in other communication, such as communication for performance and/or communication for collecting data owned by slave units 30.

Hereinafter, AP 20 operating in the "control channel priority mode" may be referred to as "control channel priority AP 20", and AP 20 operating in the "data channel priority mode" may be referred to as "data channel priority AP 20".

Further, AP controller 205 communicates with AP 20, and controls allocation of the control channel period and the data channel period in a wireless connection (radio link) with slave units 30 managed by each AP 20 based on the number of accommodated slave units of each AP 20.

Also, AP controller 205 generates information to be transmitted to any one of slave units 30 based on, for example, the scheduling result by scheduler 202. The generated information is transmitted (which may be referred to as "notified") to connection destination AP 20 of slave units 30 via communication IF 206, for example.

Examples of the information transmitted to connection destination AP 20 of slave units 30 include resource allocation information indicating channel allocation in the radio link, performance information generated by performance controller 201, and connection response information generated by slave unit connection processing unit 203.

The channels allocated to the radio link may include a control channel (for example, CSMA/CA section) and a data channel (for example, TDMA section). TDMA is an abbreviation for "time division multiple access".

Communication IF 206 is connected to, for example, AP 20, and communicates with each AP 20. Communication IF 206 may include a transmission circuit that transmits information to AP 20 and a reception circuit that receives information from AP 20.

Performance controller 201, scheduler 202, slave unit connection processing unit 203, and AP controller 205 described above exemplarily access the information stored in storage unit 204 in accordance with processing contents. Further, scheduler 202 is exemplarily connected to performance controller 201, slave unit connection processing unit 203, and AP controller 205, and can operate in cooperation with each other.

Example of Configuration of AP

Figure 3:
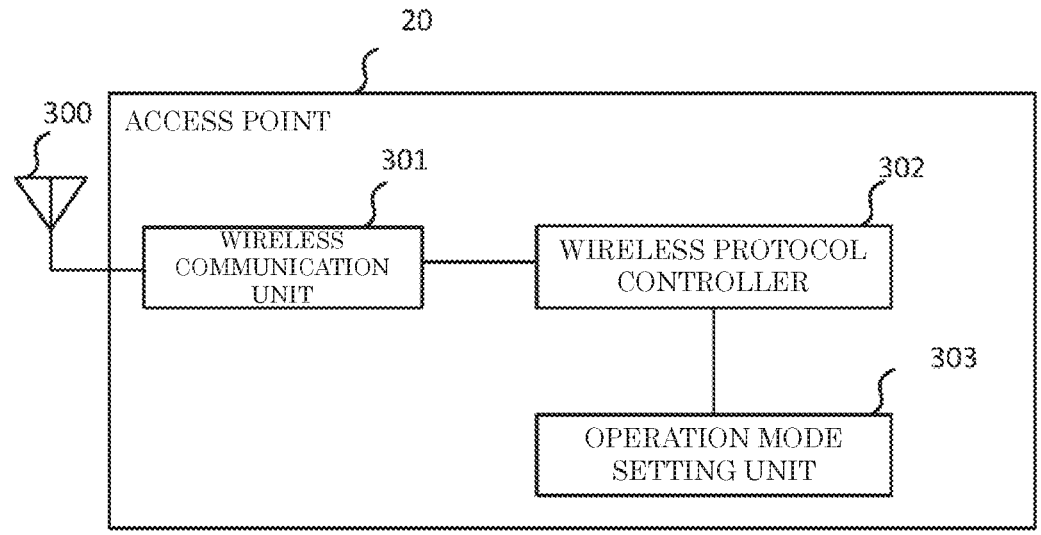
FIG. 3 is a block diagram showing one example of a configuration of an access point (AP) according to the exemplary embodiment.

FIG. 3 is a block diagram showing one example of a configuration of AP 20 according to the present exemplary embodiment.

AP 20 may include, for example, wireless communication unit 301, wireless protocol controller 302, and operation mode setting unit 303.

Wireless communication unit 301 may include, for example, antenna 300, a transmission circuit (not shown), and a reception circuit (not shown). The transmission circuit may include an encoding circuit and a modulation circuit. The reception circuit may include a demodulation circuit and a decoding circuit.

Wireless communication unit 301 demodulates a wireless signal received by antenna 300 in the demodulation circuit and decodes the demodulated signal in the decoding circuit. The demodulated and decoded received signal is output to, for example, wireless protocol controller 302.

Further, wireless communication unit 301 encodes the signal input from wireless protocol controller 302 in the encoding circuit, and modulates the encoded signal in the modulation circuit. The encoded and modulated signal is transmitted from antenna 300.

Wireless communication unit 301 may support, for example, at least one of a specific low power communication, a wireless local area network (LAN), or a Bluetooth (registered trademark) communication standard or communication method. Alternatively or additionally, wireless communication unit 301 may support at least of one of communication standards such as a low power wide area (LPWA), LoRa, narrow band-internet of things (NB-IoT), and Sigfox which have a wider coverage than a communication standard such as Bluetooth.

Wireless protocol controller 302 performs media access control (MAC control), generates a beacon (for example, a packet) including the scheduling information received from control device 10, and outputs the beacon to wireless communication unit 301. The beacon may be transmitted from AP 20 periodically or at a non-periodic timing.

Further, wireless protocol controller 302 controls the resource allocation of individual APs 20, based on the resource allocation control information (scheduling information) generated in AP controller 205 of control device 10, for example.

The control of resource allocation may include, for example, control of reducing the control channel region and control of extending the data channel region. Further, for example, when AP controller 205 notifies wireless protocol controller 302 of the information to be transmitted, wireless protocol controller 302 generates a transmission signal (for example, a packet) and transmits the transmission signal to any one of slave units 30.

Operation mode setting unit 303 determines the above-described operation mode based on operation mode information received from control device 10, for example. Further, operation mode setting unit 303 changes the frequency channel of the wireless communication unit 301 based on the information on a used frequency (channel) included in the received operation mode information.

Example of Configuration of Slave Unit

Figure 4:
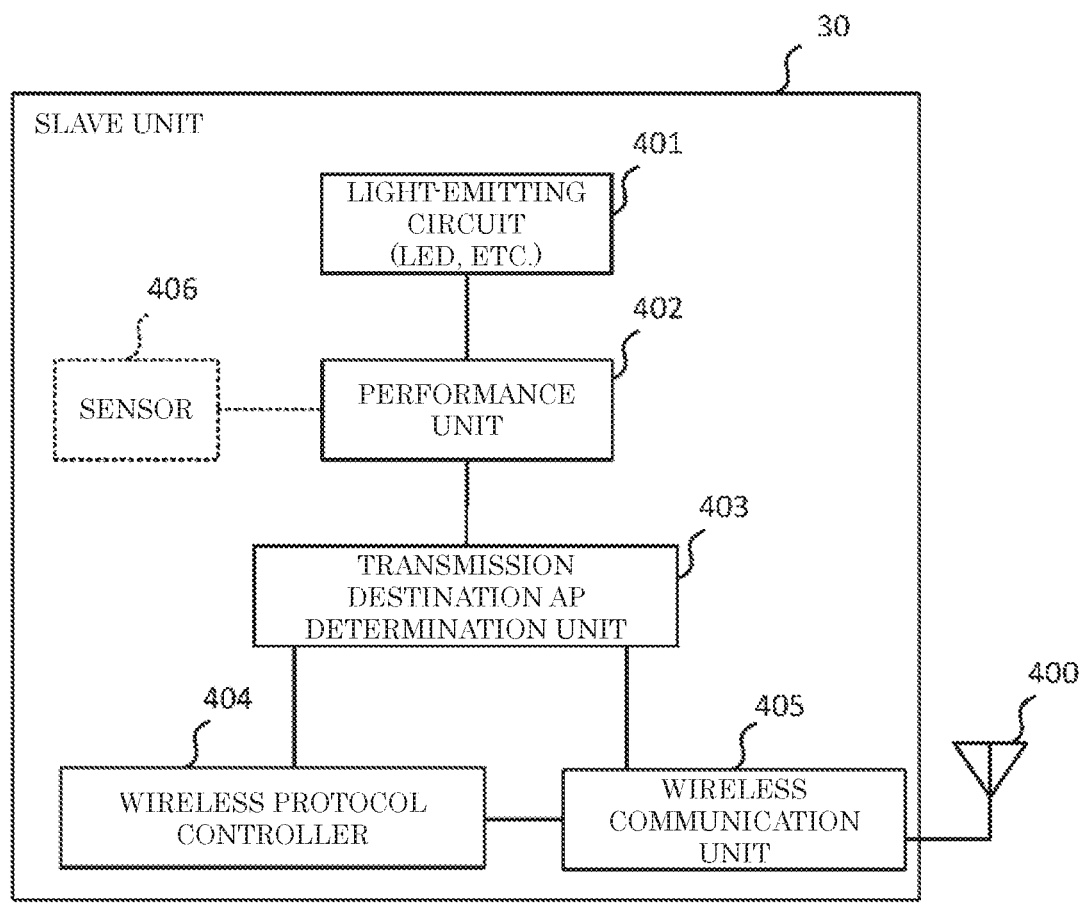
FIG. 4 is a block diagram showing one example of a configuration of a slave unit according to the exemplary embodiment.

FIG. 4 is a block diagram showing one example of a configuration of slave unit 30 according to the present exemplary embodiment.

Slave units 30 may include, for example, light-emitting circuit 401, performance unit 402, transmission destination AP determination unit 403, wireless protocol controller 404, and wireless communication unit 405.

Light-emitting circuit 401 has, for example, an LED, and emits light, turns off, or blinks when the light-emitting state or the light emission pattern of the LED is controlled by performance unit 402.

Performance unit 402, for example, extracts the performance information included in a performance control signal (for example, packet) received through wireless communication unit 405, wireless protocol controller 404, and transmission destination AP determination unit 403, and controls the light-emitting state of light-emitting circuit 401 based on the extracted performance information.

Transmission destination AP determination unit 403 performs connection processing with AP 20. For example, transmission destination AP determination unit 403 generates a connection request based on a result of a scan for searching for a connection destination AP or information on the transmission destination AP of the connection request included in the beacon received during the scan. The generated connection request is transmitted from wireless communication unit 405 to transmission destination AP 20 of the connection request, for example.

Transmission destination AP determination unit 403 receives the connection response transmitted by AP 20, for example, after transmitting the connection request, and performs connection processing with transmission source AP 20 of the connection response. For example, transmission destination AP determination unit 403 sets (or changes) the used frequency channel to the frequency channel used by AP 20 permitted to connect, based on the connection destination AP information included in the received connection response.

For example, when transmission destination AP 20 of the connection request and connection destination AP 20 indicated in the connection response are the same, transmission destination AP determination unit 403 does not change the used frequency channel.

On the other hand, when transmission destination AP of the connection request and AP 20 indicated in the connection response are different, transmission destination AP determination unit 403, for example, changes the used frequency channel to the frequency channel used by AP 20 indicated in the connection response.

Hereinafter, the "transmission destination AP of the connection request" may be abbreviated as "connection destination AP".

Wireless protocol controller 404 performs MAC control including, for example, a scan for searching for the connection destination AP, transfer and reception timing control of a signal (for example, packet), and a destination determination of whether the destination of the received signal is addressed to slave unit 30 itself. Wireless protocol controller 404 may be regarded as one example of a connection processing circuit that performs wireless connection processing with AP 20.

It may be considered that the "control circuit" of slave unit 30 is configured by a part or all of performance unit 402, transmission destination AP determination unit 403, and wireless protocol controller 404, which are described above.

Wireless communication unit 405 may include, for example, antenna 400, a transmission circuit (not shown), and a reception circuit (not shown). The transmission circuit may include an encoding circuit and a modulation circuit. The reception circuit may include a demodulation circuit and a decoding circuit.

Wireless communication unit 405 demodulates a wireless signal received by antenna 400 in the demodulation circuit and decodes the demodulated signal in the decoding circuit. The demodulated and decoded received signal is output to, for example, wireless protocol controller 404.

Further, wireless communication unit 405 encodes the signal input from wireless protocol controller 404 in the encoding circuit, and modulates the encoded signal in the modulation circuit. The encoded and modulated signal is transmitted from antenna 400.

Similar to wireless communication unit 301 of AP 20, wireless communication unit 405 may support at least one of a specific low power communication, a wireless LAN, or a Bluetooth communication standard or communication method. Alternatively or additionally, wireless communication unit 405 may support at least one of communication standards such as LPWA, LoRa, NB-IoT, and Sigfox.

Note that slave unit 30 may be provided with sensor 406 as shown in FIG. 4. Exemplarily, sensor 406 may be connected to performance unit 402. Sensor 406 may obtain, for example, information indicating a degree of excitement of the spectators and/or position information of slave unit 30.

The obtained sensor information may be transmitted from wireless communication unit 405 to control device 10 via AP 20, for example. Control device 10 may control the light-emitting state of light-emitting circuit 401 of slave unit 30 based on the sensor information by wireless communication via AP 20. The performance control using the sensor information can diversify the mass performance by slave units 30.

Example of Determination Criteria of Connection Destination AP in Control Device Next, one example of the operation relating to the determination of connection destination AP 20 of slave unit 30 in control device 10 according to the present exemplary embodiment will be described with reference to FIG. 5. The processing related to the determination of connection destination AP 20 of slave unit 30 may be performed by, for example, slave unit connection processing unit 203 (see FIG. 2). Note that the processing of S1204 indicated by the dotted line in FIG. 5 may be optional.

In S1201, slave unit connection processing unit 203 waits for a connection request to be received. Upon receipt of a connection request (Yes in S1201), slave unit connection processing unit 203 performs S1202.

When slave unit connection processing unit 203 does not receive the connection request (No in S1201), slave unit connection processing unit 203 stays in S1201 and waits for receiving a connection request, for example, for a predetermined period.

Note that slave unit connection processing unit 203 may end the processing when a connection request is not received within the predetermined period in S1201.

In S1202, slave unit connection processing unit 203 obtains information indicating AP 20 that has received the connection request from slave unit 30 (connection request reception AP 20) and the operation mode ("control channel priority mode" or "data channel priority mode") of connection request reception AP 20.

Slave unit connection processing unit 203 determines the connection destination (or accommodation destination) AP of slave unit 30 that has transmitted the connection request, based on, for example, the operation mode of connection request reception AP 20 and the phase managed by scheduler 202 (S1203 and S1205).

In the present exemplary embodiment, for example, the following four phases are used as the "phases".

Phase 1: When the number of accommodated slave units of AP 20 per unit is smaller than or equal to threshold #1

Phase 2: When the number of accommodated slave units of AP 20 per unit exceeds threshold #1 and is smaller than or equal to threshold #2 which is larger than threshold #1

Phase 3: When the number of accommodated slave units of AP 20 per unit exceeds threshold #2

Phase 4: Period until performance ends

Note that the performance may be started in any of the above phases.

Threshold #1 and threshold #2 will be described later.

FIG. 6 shows one example of determination of the connection destination AP by control device 10.

As illustrated in FIG. 6, in Phases 1 and 2, when the connection request received by control channel priority AP 20 is received by slave unit connection processing unit 203, data channel priority AP 20 is determined as connection destination AP 20 of slave unit 30 that has transmitted the connection request.

In phase 3, when the connection request received by control channel priority AP 20 is received by slave unit connection processing unit 203, control channel priority AP 20 is determined as connection destination AP 20 of slave unit 30 that has transmitted the connection request.

In phase 4, when the connection request received by control channel priority AP 20 is received by slave unit connection processing unit 203, control channel priority AP 20 or data channel priority AP 20 is determined as connection destination AP 20 of slave unit 30 that has transmitted the connection request.

Further, for example, in phases 1 and 2, when the connection request received by data channel priority AP 20 is received by slave unit connection processing unit 203, data channel priority AP 20 is determined as connection destination AP 20 of slave unit 30 that has transmitted the connection request.

In phase 3, when the connection request received by data channel priority AP 20 is received by slave unit connection processing unit 203, data channel priority AP 20 or control channel priority AP 20 is determined as connection destination AP 20 of slave unit 30 that has transmitted the connection request.

In phase 4, when the connection request received by data channel priority AP 20 is received by slave unit connection processing unit 203, control channel priority AP 20 or data channel priority AP 20 is determined as connection destination AP 20 of slave unit 30 that has transmitted the connection request.

Figure 5:
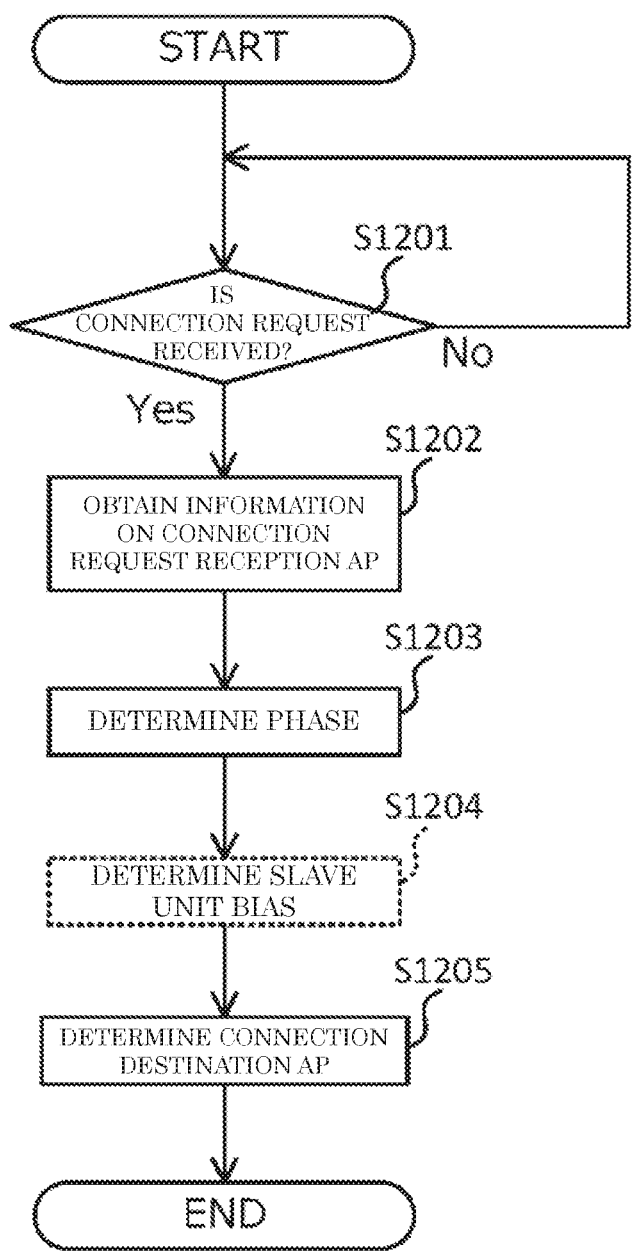
FIG. 5 is a flowchart showing one example of an operation of a slave unit connection processing unit according to the exemplary embodiment.

As shown by the dotted line in FIG. 5, upon determination of connection destination AP 20, for example, the processing of S1204 of determining whether the number of accommodated slave units is biased among APs 20 may be performed in slave unit connection processing unit 203.

For example, when slave unit connection processing unit 203 determines that the number of accommodated slave units is biased among APs 20, slave unit connection processing unit 203 may determine AP 20 to which slave unit 30 as the transmission source of the newly received connection request is connected so as to reduce the bias.

Example of Connection Protocol

Next, one example of connection processing of slave unit 30 (for example, slave unit 30-1) according to the present exemplary embodiment will be described with reference to a sequence diagram of FIG. 7. The term "connection processing" may be read as a term such as "connection protocol", "connection step", "connection sequence", or "connection procedure".

In S501, control device 10 determines AP information including, for example, information indicating the operation mode of APs 20-1 and 20-2 (AP operation mode information) and information indicating the used frequency channel.

For example, control device 10 sets the operation mode of AP 20-1 to the "control channel priority mode" and sets the operation mode of AP 20-2 to the "data channel priority mode". Further, control device 10 sets the used frequency channel of AP 20-1 to CH0 and sets the used frequency channel of AP 20-2 to CH1.

Control device 10 transmits the AP information including the above-mentioned information indicating the setting to APs 20-1 and 20-2 (S502). The AP information may include, for example, a command type, a destination AP address, AP operation mode information, and resource allocation information, as indicated by reference numeral C514 in FIG. 7.

In the "command type", for example, AP information is indicated. In the "destination AP address", an address of AP 20 as a destination of the AP information is set. In the "AP operation mode information", information indicating either "control channel priority mode" or "data channel priority mode" is set.

In the resource allocation information, for example, information indicating allocation of control channels and data channels of individual APs 20 may be set.

In the above example, the AP information indicating that the operation mode is the "control channel priority mode" and the used frequency channel is "CH0" is transmitted to AP 20-1 in S502.

The AP information indicating that the operation mode is the "data channel priority mode" and the used frequency channel is "CH1" is transmitted to AP 20-2 in S502.

Each of APs 20-1 and 20-2 sets the operation mode and the used frequency channel in accordance with the AP information received from control device 10. Operation mode setting unit 303 sets the operation mode, for example. Wireless protocol controller 302 sets the used frequency channel, for example.

After setting the operation mode and the used frequency channel, each of APs 20-1 and 20-2 generates beacon C515 and transmits a beacon on the set used frequency channel (S503 and S504). Note that the beacon may be transmitted periodically or at any non-periodic timing.

The beacon may include, for example, a packet type, a transmission source AP address, and resource allocation information. In the "packet type", for example, the beacon is indicated. In the "transmission source AP address", for example, the address of transmission source AP 20 of the beacon is set. In the "resource allocation information", for example, information indicating allocation of the control channels and the data channels of individual APs 20 may be set.

Beacon C515 may include control information such as information (resource allocation information) indicating a status of band allocation to the control channel period and the data communication period. By including the resource allocation information in the beacon, slave unit 30 that has received the beacon can determine destination AP 20 to transmit connection request C516.

Figure 7:
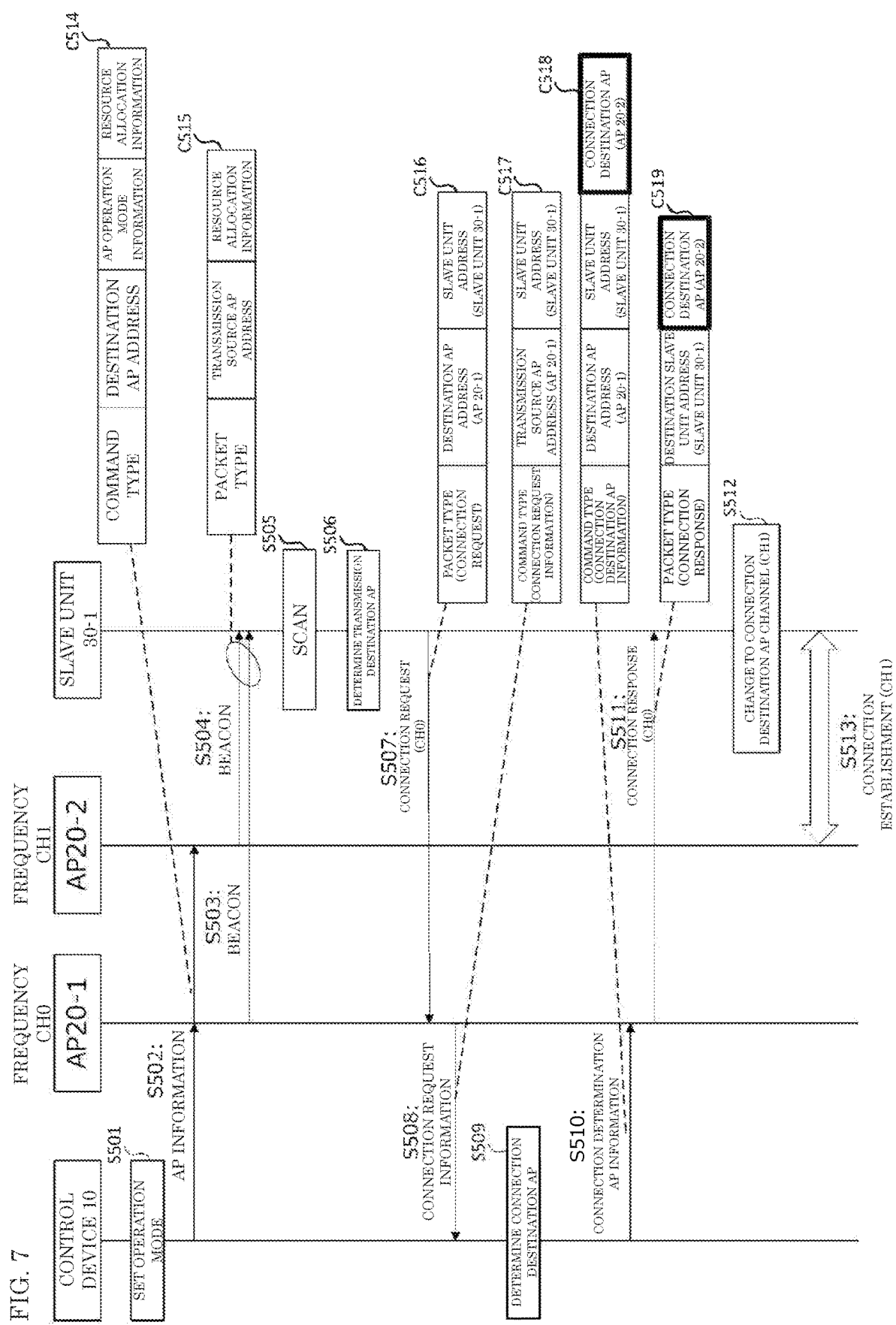
FIG. 7 is a sequence diagram showing one example of connection processing according to the exemplary embodiment.

For example, in the beacon transmitted from AP 20-1 in S503, band allocation information for the control channels of AP 20-1 or all APs 20 may be set (not shown in beacon C515 in FIG. 7). In the beacon transmitted from the AP 20-2 in S504, band allocation information for the control channels of AP 20-2 or all APs 20 may be set (not shown in beacon C515 in FIG. 7).

When slave unit 30-1 receives beacon C515 transmitted by AP 20-1 and AP 20-2 by scanning (S505), transmission destination AP 20 of connection request C516 is determined, for example, based on received beacon C515 (S506). The determination of transmission destination AP 20 of the connection request by slave unit 30 may be, for example, selecting AP 20 having a long control channel period with a high probability and AP 20 having a short control channel period with a low probability. As a result, a collision of connection request C516 can be mitigated, and time required to establish a connection with AP 20 can be reduced.

The resource allocation information is not set in beacon C515, and for example, when transmission destination AP determination unit 403 of slave unit 30-1 receives both the beacons transmitted by AP 20-1 and AP 20-2, transmission destination AP determination unit 403 may determine transmission source AP 20 of the beacon having a good reception quality index as connection destination AP 20.

When the resource allocation information is not set in beacon C515 and transmission destination AP determination unit 403 of slave unit 30-1 receives one of the beacons transmitted by AP 20-1 or AP 20-2, transmission destination AP determination unit 403 may determine AP 20 that has transmitted the received beacon as connection destination AP 20.

Examples of the reception quality index include a received signal strength indicator (RSSI), a signal to noise ratio (SNR), and a signal to interference noise ratio (SINR).

Alternatively, when the connection destination AP information is set in the beacon that has been successfully received, transmission destination AP determination unit 403 may determine AP 20 indicated by the connection destination AP information as connection destination AP 20, for example, regardless of the reception quality of the beacon.

When connection destination AP 20 is determined, slave unit 30-1 transmits connection request C516 to the determined connection destination AP (for example, AP 20-1) using frequency channel CH0 (S507).

The connection request to AP 20-1 is transmitted, for example, in the control channel period identified based on the resource allocation information of the beacon received from AP 20-1. In connection request C516, the connection request is set in the "packet type", the "destination AP address" is set to an address of AP 20-1, and the "transmission source address" (slave unit address) is set to an address of slave unit 30-1.

When AP 20-1 receives the connection request transmitted by slave unit 30-1 on frequency channel CH0, AP 20-1 transmits connection request information (C517) included in the received connection request to control device 10, for example, in wireless protocol controller 302 (S508).

In connection request information C517 transmitted to control device 10, the connection request information is set to the "command type", the address of AP 20-1 is set to the "transmission source AP address", and the address of slave unit 30-1 as the transmission source of the connection request is set to the "slave unit address".

When control device 10 receives connection request information C517 from AP 20-1, for example, slave unit connection processing unit 203 determines connection destination AP 20 of slave unit 30-1 that has transmitted connection request C516 (S509).

Slave unit connection processing unit 203 determines the connection destination AP (for example, AP 20-2) of slave unit 30-1 that has transmitted connection request C516, for example, based on the number of accommodated slave units of AP 20-1 and AP 20-2, and then generates connection destination AP information C518 indicating determined connection destination AP 20-2. Connection destination AP information C518 is transmitted to AP 20-1 that has transmitted connection request information C517 to control device 10 (S510).

In connection destination AP information C518, the connection destination AP information is set to the "command type", the address of AP 20-1 is set to the "destination AP address", and the address of slave unit 30-1 as the transmission source of the connection request is set to the "slave unit address". Further, in connection destination AP information C518, the address of AP 20-2 is set to "connection destination AP".

When AP 20-1 receives connection destination AP information C518 from control device 10, AP 20-1 generates connection response C519 addressed to slave unit 30-1 that has transmitted connection request C516, and transmits the connection response addressed to slave unit 30-1 on frequency channel CH0 (S511).

In connection response C519, the connection destination AP information is set to the "command type", the address of slave unit 30-1 is set to the "destination (slave unit) address", and the address of AP 20-2 is set to the "connection destination".

When slave unit 30-1 receives connection response C519 from AP 20-1, used frequency channel CH0 is set (changed) to frequency channel CH1 based on the connection destination AP information indicated in connection response C519, for example, in wireless protocol controller 404 (S512). Frequency channel CH1 establishes a connection between slave unit 30-1 and AP 20-2 (S513).

FIG. 7 is an example of slave unit 30-1 determining AP 20-1 as the connection destination AP. When AP 20-2 is determined as the connection destination AP, also the connection between slave unit 30-1 and AP 20-2 is established similar to the connection processing described above.

As described above, by including the resource allocation information of AP 20 in the beacon transmitted by AP 20, the resource allocation information of each AP 20 is notified to slave unit 30. Slave unit 30 determines connection destination AP 20 based on the resource allocation information and the reception quality of the beacon and transmits the connection request, thereby shortening the time until the connection with AP 20 is established.

Further, by including the connection destination AP information in the connection response transmitted by AP 20-1, slave unit 30-1 is aware of AP 20 in which data channel period T is extended before a connection with AP 20 is established as described later. It is therefore possible to avoid the handover processing that occurs when data channel period T is reduced.

Note that the beacon may include information indicating a congestion degree of the control channel. For the "information indicating the congestion degree", for example, a "reception frequency information of the connection request" obtained by measuring a number of times of reception of the connection request received by AP 20 per unit time may be used. Alternatively, for the "information indicating the congestion degree", "information on the number of times the connection request has been transmitted until the connection is established" may be used, the information being obtained by, for example, a notification from slave unit 30 of how many connection requests slave unit 30 has transmitted to establish the connection, after the connection has been established. When the beacon includes the "information indicating the congestion degree" of the control channel, slave unit 30 determines AP 20 having a low congestion degree among connection destination AP candidates having different congestion degrees of the control channel as connection destination AP 20 upon determination of connection destination AP 20, and transmits the connection request. This can reduce a collision occurrence probability of the connection request.

Further, the connection request transmitted by slave unit 30 may include, for example, information on one or more APs 20 that can receive a signal (receivable AP information). Control device 10 may use the receivable AP information as an index for determining connection destination AP 20.

For example, control device 10 determines AP 20 indicated in the receivable AP information as connection destination AP 20 of slave unit 30. In other words, AP 20 that is not indicated in the receivable AP information is not determined as connection destination AP 20 of slave unit 30.

As a result, when it is highly likely that slave unit 30 does not receive or fails to receive the information on connection destination AP 20 designated by control device 10 by the connection response, slave unit 30 can be prevented from repeating retransmitting the connection request.

Further, by including the connection destination AP information in the connection response to slave unit 30 can reduce the case where the number of accommodated slave units is biased among APs 20.

For example, control device 10 designates the connection destination AP such that the number of accommodated slave units is not biased among data channel priority APs 20 from phase 1 to phase 2, and control device 10 designates the connection destination AP such that the number of accommodated slave units is not biased among APs 20 in phase 3 and thereafter.

Example of Operation of Slave Unit

Figure 8:
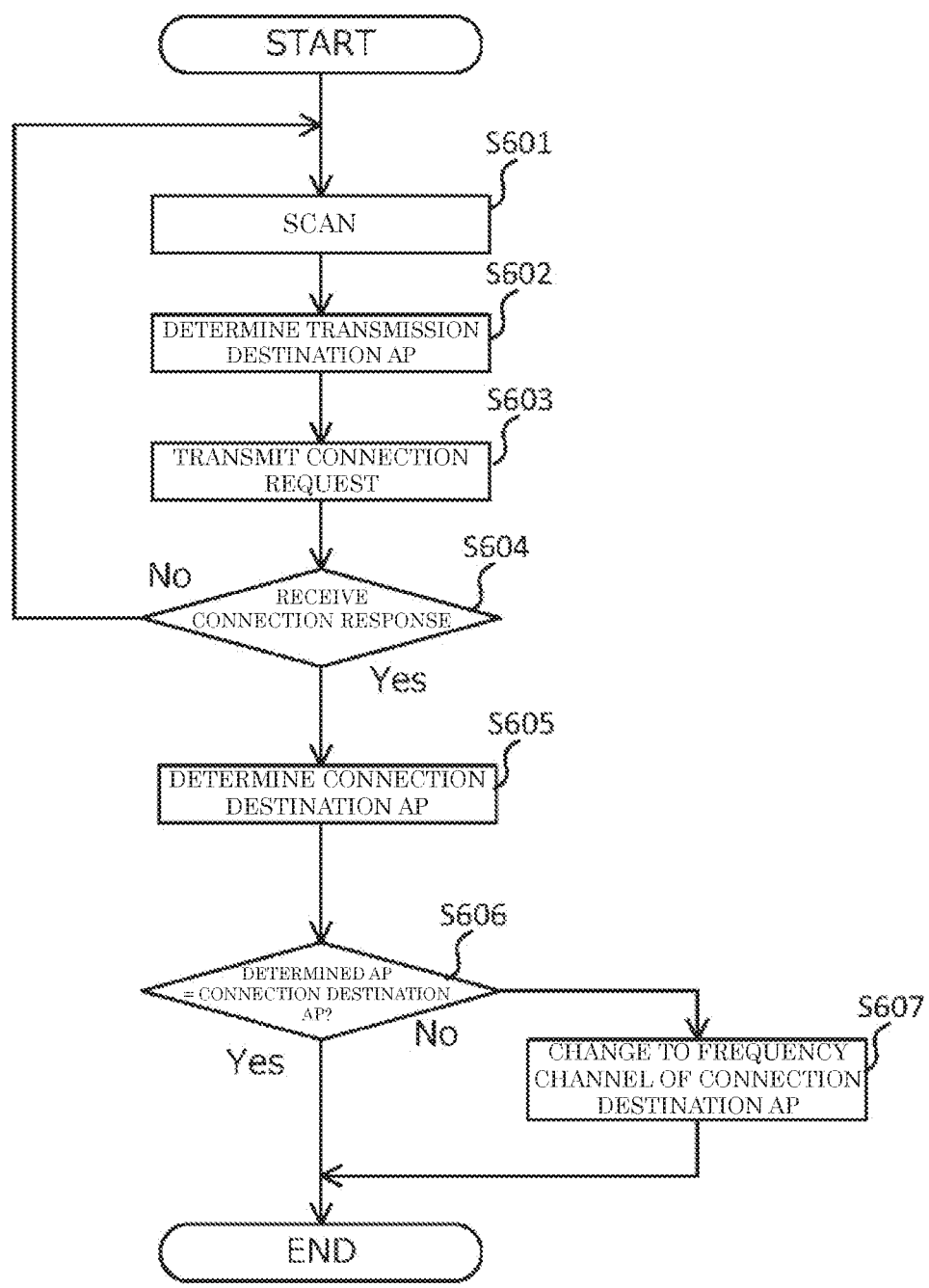
FIG. 8 is a flowchart showing one example of an operation of the slave unit according to the exemplary embodiment.

Next, one example of an operation relating to a connection processing of slave unit 30 (for example, slave unit 30-1) according to the exemplary embodiment will be described with reference to FIG. 8. FIG. 8 is a flowchart showing one example of an operation of slave unit 30-1 according to the present exemplary embodiment.

In S601, slave unit 30-1 scans, for example, by wireless protocol controller 404 and wireless communication unit 405, and receives the beacon transmitted by AP 20-1 and AP 20-2.

For example, slave unit 30-1 switches the frequency channel at regular intervals and scans one or more available frequency channels. Slave unit 30-1 stores information (for example, AP information) included in the beacon received by the scan in the storage unit (not shown). The AP information may include, for example, information indicating candidates for connectable APs 20, and resource allocation information for connectable APs 20.

For example, transmission destination AP determination unit 403 of slave unit 30-1 that has received the beacon determines and selects connection destination AP 20 from the candidates for connectable APs 20 (S602). Slave unit 30-1 transmits a connection request to determined AP 20, for example, by wireless protocol controller 404 and wireless communication unit 405 (S603).

Transmission destination AP 20 of the connection request by slave unit 30-1, for example, may be determined based on the AP information included in the received beacon, or determined by AP 20 having the best beacon reception quality index (for example, RSSI, SNR, or SINR). Further, connection destination AP 20 may be randomly determined based on, for example, a random number.

After transmitting the connection request, slave unit 30-1 waits for reception of a connection response transmitted from transmission destination AP 20 of the connection request to slave unit 30-1 in S603 (S604). When the connection response is not received within a predetermined period (No in S604), slave unit 30-1 may return the processing to S601. Note that the connection request may be transmitted to same AP 20 a plurality of times with an interval until the connection response is received.

When slave unit 30-1 receives the connection response after transmitting the connection request (Yes in S604), connection destination AP 20 is determined, for example, in transmission destination AP determination unit 403, based on the connection destination AP information indicated in the received connection response (S605).

Transmission destination AP determination unit 403 determines whether determined connection destination AP 20 is the same as transmission destination AP 20 of the connection request (S606).

When the determined connection destination AP is the same as the transmission destination AP of the connection request (Yes in S606), transmission destination AP determination unit 403 may end the processing without changing the used frequency channel.

When the determined connection destination AP is different from the transmission destination AP of the connection request (No in S606), transmission destination AP determination unit 403 changes the used frequency channel to the used frequency channel of the connection destination AP (S607) in order to connect to connection destination AP 20 indicated in the connection response. After changing the used frequency channel, transmission destination AP determination unit 403 may end the processing.

When slave unit 30-1 does not receive the connection response including the information on AP 20 different from transmission destination AP 20 of the connection request within the predetermined period, transmission destination AP determination unit 403 may perform the connection processing with transmission source AP 20 of the connection request.

Further, when the information on transmission destination AP 20 of the connection request is set in the connection response, but the information on the AP different from the transmission destination AP 20 of the connection request is not set in the connection response, transmission destination AP determination unit 403 may determine that the information on the AP different from transmission destination AP 20 of the connection request is not received.

Example of Radio Resource Control of AP by Control Device

Next, one example of an operation performed by scheduler 202 in control device 10 according to the present exemplary embodiment will be described with reference to FIGS. 9 to 13.

Scheduler 202 controls the scheduling (in other words, allocation) of the radio resource managed by AP 20, based on, for example, the number of accommodated slave units of AP 20 and the phases described above.

In FIGS. 10 to 13, a beacon transmission period is represented by "B", the control channel period is represented by "R", and the data channel period is represented by "T". One example of an access control method in control channel period R is CSMA/CA, and one example of the access control method in data channel period T is TDMA.

Thus, the "control channel period" may be referred to as a "CSMA/CA period" and the "data channel period" may be referred to as a "TDMA period".

A terminal device having a transmission right in data channel period T is, for example, AP 20 and slave unit 30 that has received poling from AP 20. In data channel period T, slave unit 30 for which AP 20 performs polling is, for example, slave unit 30 that has established a connection with the AP.

As a result, the signal transmitted in control channel period R is, for example, a connection request transmitted by slave unit 30 that has not established a connection with AP 20, and a connection response transmitted by each AP 20.

The signal transmitted in data channel period T is, for example, a performance control signal transmitted by each AP 20, and a signal transmitted by slave unit 30 having a connection established with AP 20 by polling from AP 20.

Figure 9:
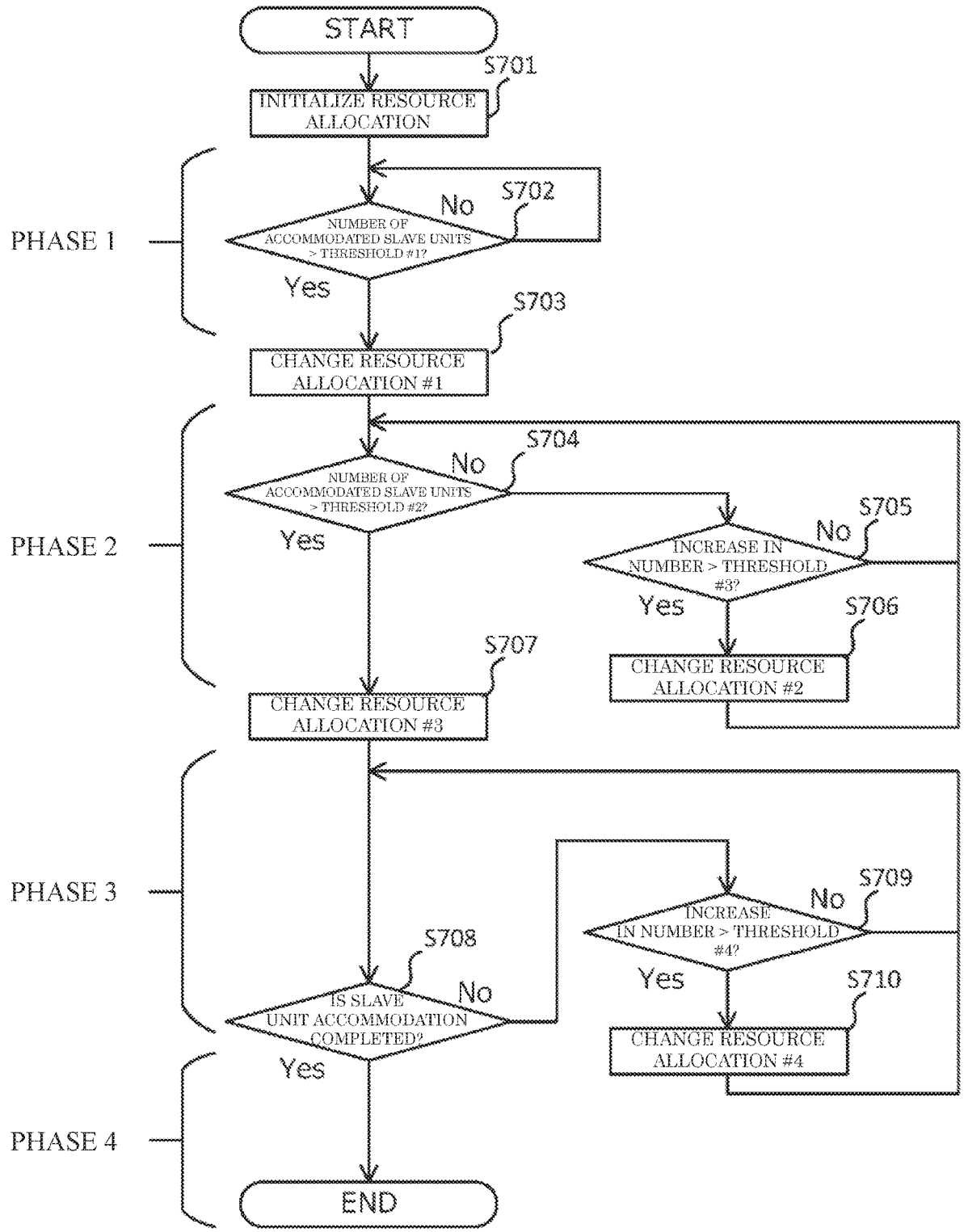
FIG. 9 is a flowchart showing one example of an operation of a scheduler according to the exemplary embodiment.

FIG. 9 is a flowchart showing one example of an operation of scheduler 202 according to the present exemplary embodiment.

Scheduler 202, for example, initializes time resource allocation (S701). One example of initialization of the time resource allocation will be described with reference to FIG. 10B.

Figure 10A:
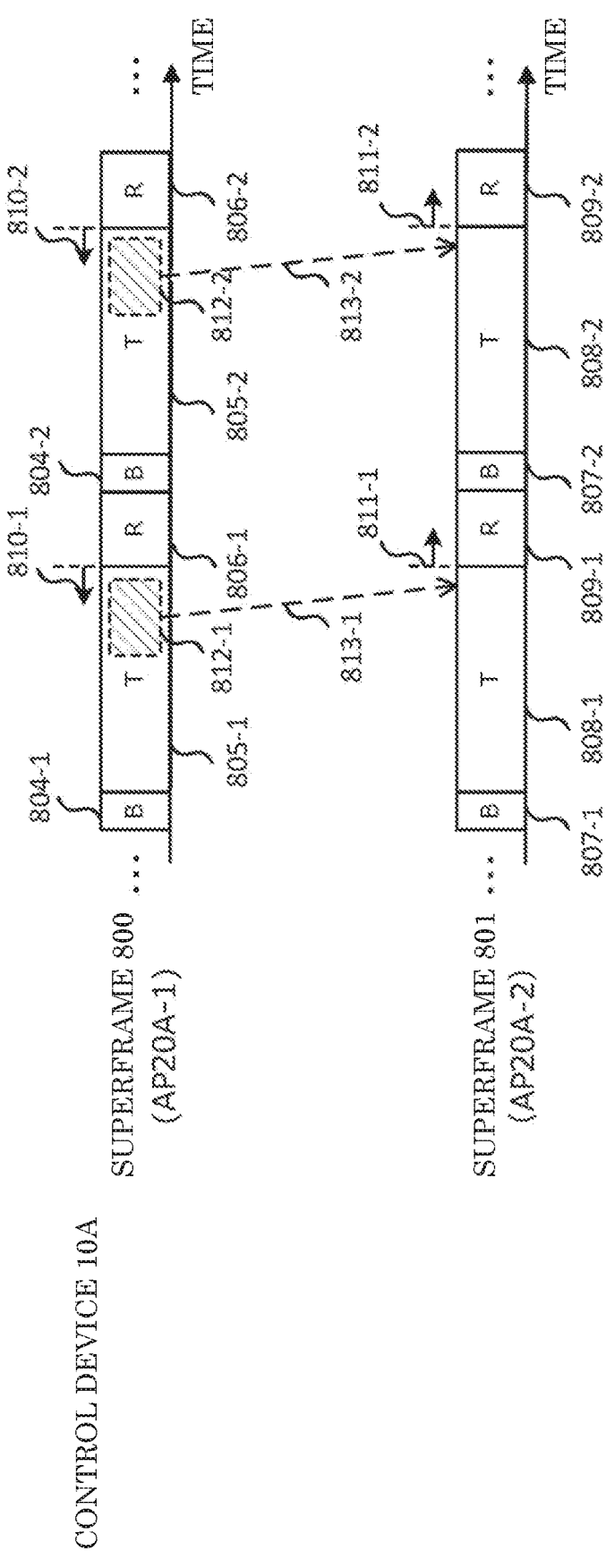
FIG. 10A is a diagram showing one example of channel setting processing according to the exemplary embodiment.
Figure 10B:
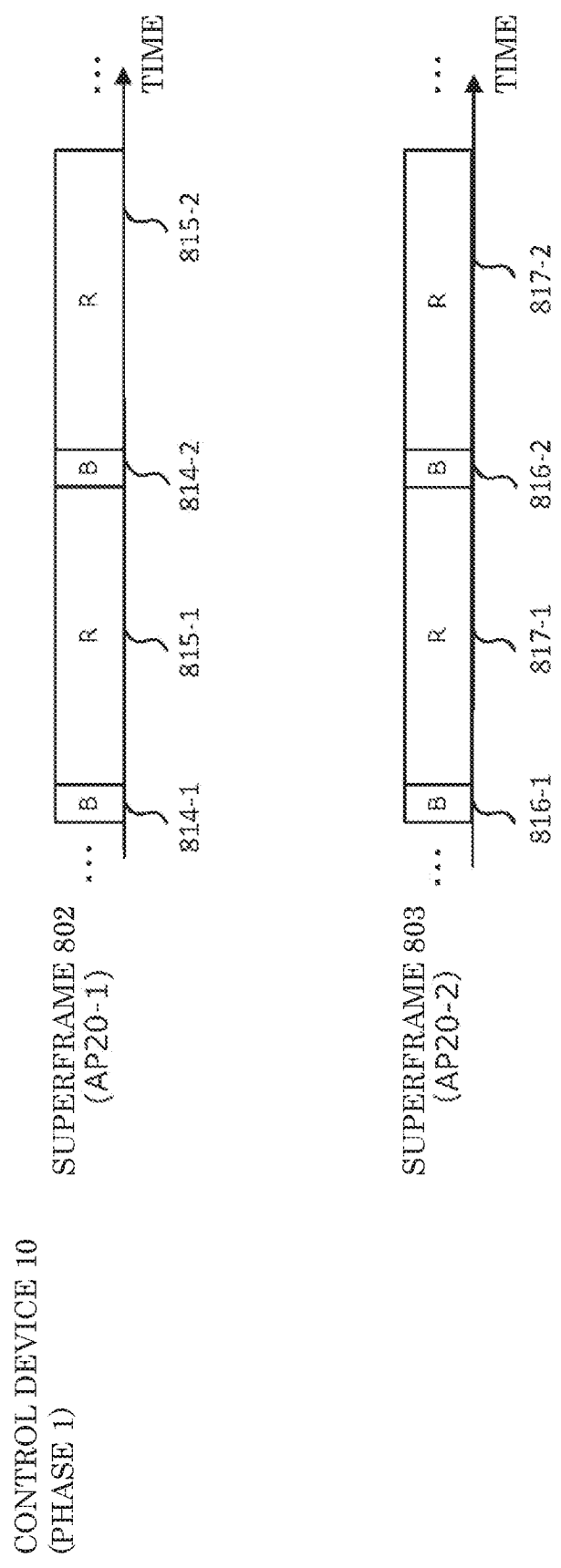
FIG. 10B is a diagram showing one example of the channel setting processing according to the exemplary embodiment.

FIG. 10B is a diagram showing one example of the time resource allocation of AP 20-1 and AP 20-2 set by scheduler 202. Note that FIG. 10A is a diagram showing a comparative example with respect to FIG. 10B. A description of FIG. 10A will be given later.

In FIG. 10B, superframe 802 managed by AP 20-1 has a length corresponding to a beacon transmission interval in a time domain. Note that FIG. 10B shows superframe 802 for two.

Scheduler 202 of AP 20-1 allocates, for example, a period other than beacon transmission periods B (814-1 and 814-2) of superframe 802 to control channel periods R (815-1 and 815-2) in the initialization of the time resource allocation. The data channel period is not set in superframe 802 of FIG. 10B.

Thus, superframe 802 managed by AP 20-1 is configured by beacon transmission periods B (814-1 and 814-2) and control channel periods R (815-1 and 815-2).

Similarly, scheduler 202 of AP 20-2 allocates, for example, a period other than beacon transmission periods B (816-1 and 816-2) of superframe 803 to control channel periods R (817-1 and 817-2) in the initialization of the time resource allocation. The data channel period is not set in superframe 803 of FIG. 10B.

Thus, superframe 803 managed by AP 20-2 is configured by beacon transmission periods B (816-1 and 816-2) and control channel periods R (817-1 and 817-2).

In other words, scheduler 202 may set a total period of control channel period R and data channel period T that can be allocated to the radio link managed by each AP 20 (for example, superframe) to control channel period R in an initial setting before the start of performance.

Control channel period R is maximized in the radio link managed by each AP 20, and thus the collision occurrence probability when a plurality of the connection requests is transmitted from multiple slave units 30 can be reduced. This can increase a success rate of receiving the connection request in AP 20.

In the initial setting of FIG. 10B, the entire period other than beacon transmission period B is allocated to control channel period R in superframe 802 (803). In an initial allocation, data channel period T shorter than control channel period R may be allocated to a part of the period other than beacon transmission period B.

Next, in S702 of FIG. 9, scheduler 202 determines whether the number of accommodated slave units is greater than threshold #1.

When the number of accommodated slave units is smaller than or equal to threshold #1 (No in S702), scheduler 202 returns the processing to S702 without performing control to change the allocation of time resources. In other words, scheduler 202 continues to monitor whether the number of accommodated slave units is greater than threshold #1. For example, when the number of accommodated slave units is smaller than threshold #1, the performance has not started in phase 1, and this case corresponds to a situation where the slave unit accommodation is prioritized.

Note that threshold #1 may be set to, for example, the number of slave units that can suspend a start of extension of data channel period T because each AP 20 gives priority to accommodation of the slave units. Unlike FIG. 10B, when data channel period T is set in advance for each AP 20, threshold #1 may be set for the number of slave units that can be accommodated in set data channel period T. Hereinafter, the control for changing the allocation of time resources may be abbreviated as "resource allocation change control".

Figure 11:
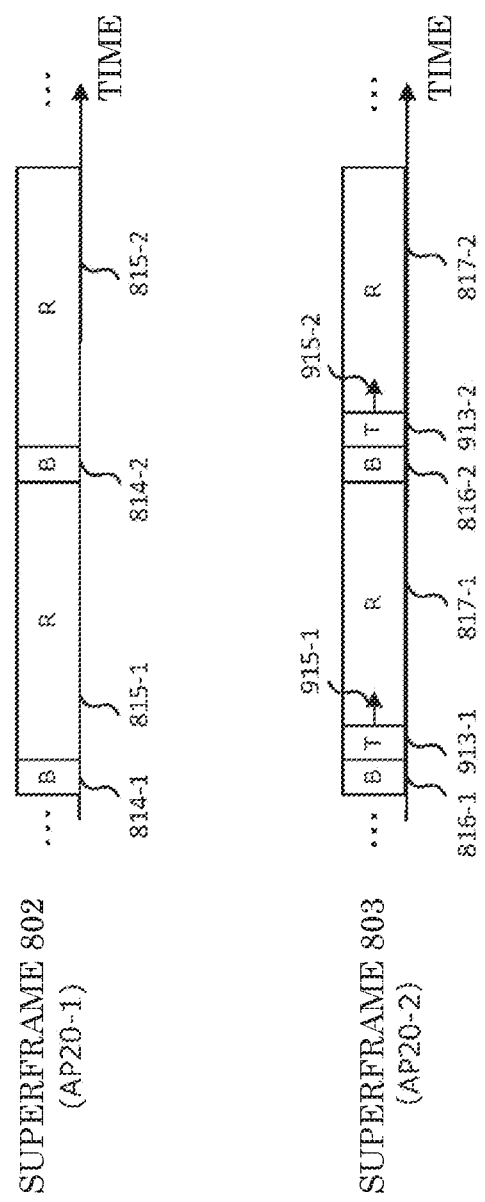
FIG. 11 is a diagram for explaining the channel setting processing according to the exemplary embodiment.

When the number of accommodated slave units is greater than threshold #1 (Yes in S702), scheduler 202 performs first resource allocation change control #1 (S703). FIG. 11 shows one example of the time resource allocation of AP 20-1 and AP 20-2 in first resource allocation change control #1. In FIG. 11, arrows 915-1, 915-2 are shown as an example in which scheduler 202 of AP 20-2 performs first resource allocation change control #1.

Scheduler 202 of AP 20-2 allocates, for example, a part of control channel periods R (817-1 and 817-2) to data channel periods T (913-1 and 913-2) in first resource allocation change control #1.

For example, in superframe 803, control channel periods R are reduced (see 817-1 and 817-2), and data channel periods T are set in accordance with the reduction of control channel periods R (extension; see arrows 915-1 and 915-2).

Scheduler 202, for example, sequentially reduces control channel periods R in accordance with an increase in slave unit 30 to which the data channel is allocated, and extends data channel periods T in accordance with the reduction in control channel periods R in superframe 803. "Sequentially" may be read as "stepwise" or "gradually".

In S704 of FIG. 9, scheduler 202 determines whether the number of accommodated slave units is greater than threshold #2. Threshold #2 may be set to, for example, the number of slave units that can be allocated to AP 20-2. When the number of slave units that can be accommodated in AP 20-2 (threshold #2) is exceeded, the allocation to the data channel is started in AP 20-1.

When the number of accommodated slave units of AP 20 is smaller than or equal to threshold #2 (No in S704), scheduler 202 determines whether the increase in the number of accommodated slave units is greater than threshold #3 (S705). Threshold #3 may be set to, for example, the number of slave units sharing a unit period in which each AP 20 extends or reduces data channel period T. Every time the number of accommodated slave units increases by a predetermined number (threshold #3), data channel period T of data channel priority AP 20-2 is further extended.

When the number of accommodated slave units of AP 20 is greater than threshold #3 (Yes in S705), scheduler 202 performs second resource allocation change control #2 and further extends the allocation to the data channel in AP 20-2 (S706). For example, scheduler 202 of AP 20-2 reduces control channel periods R, and further extends data channel periods T in accordance with the reduction of control channel periods R in superframe 803 in the same manner as in FIG. 11.

When second resource allocation change control #2 is completed, or when the number of accommodated slave units is smaller than or equal to threshold #3 (No in S705), scheduler 202 may return the processing to S704.

Figure 12A:
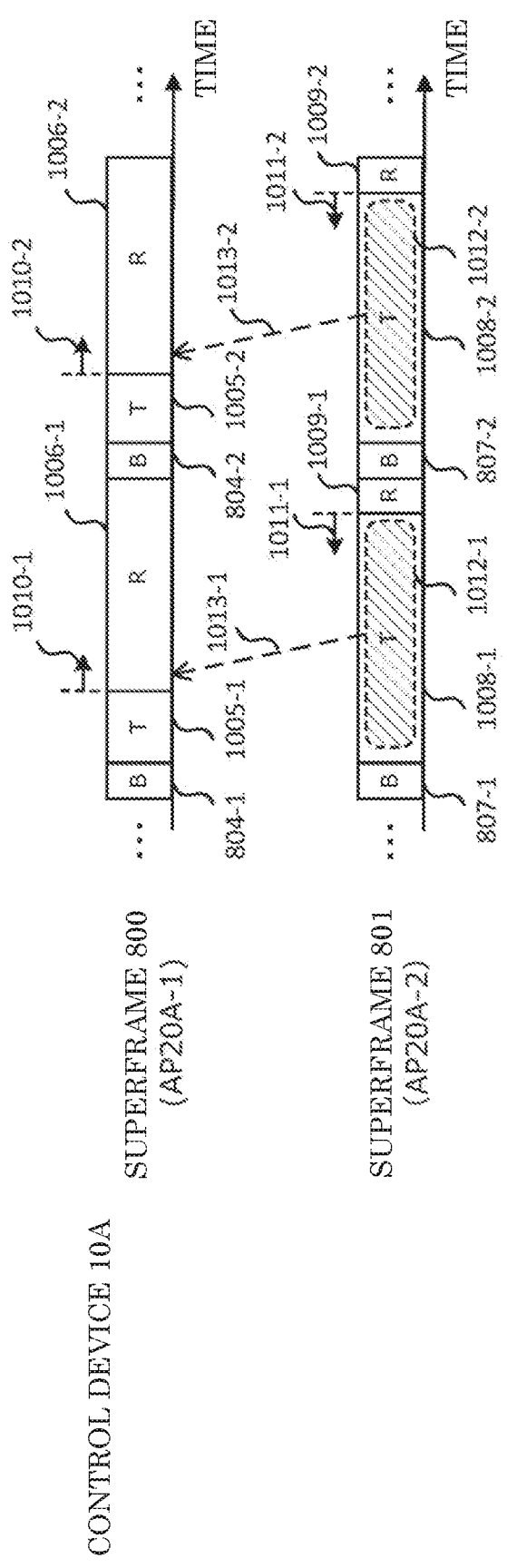
FIG. 12A is a diagram showing one example of the channel setting processing according to the exemplary embodiment.
Figure 12B:
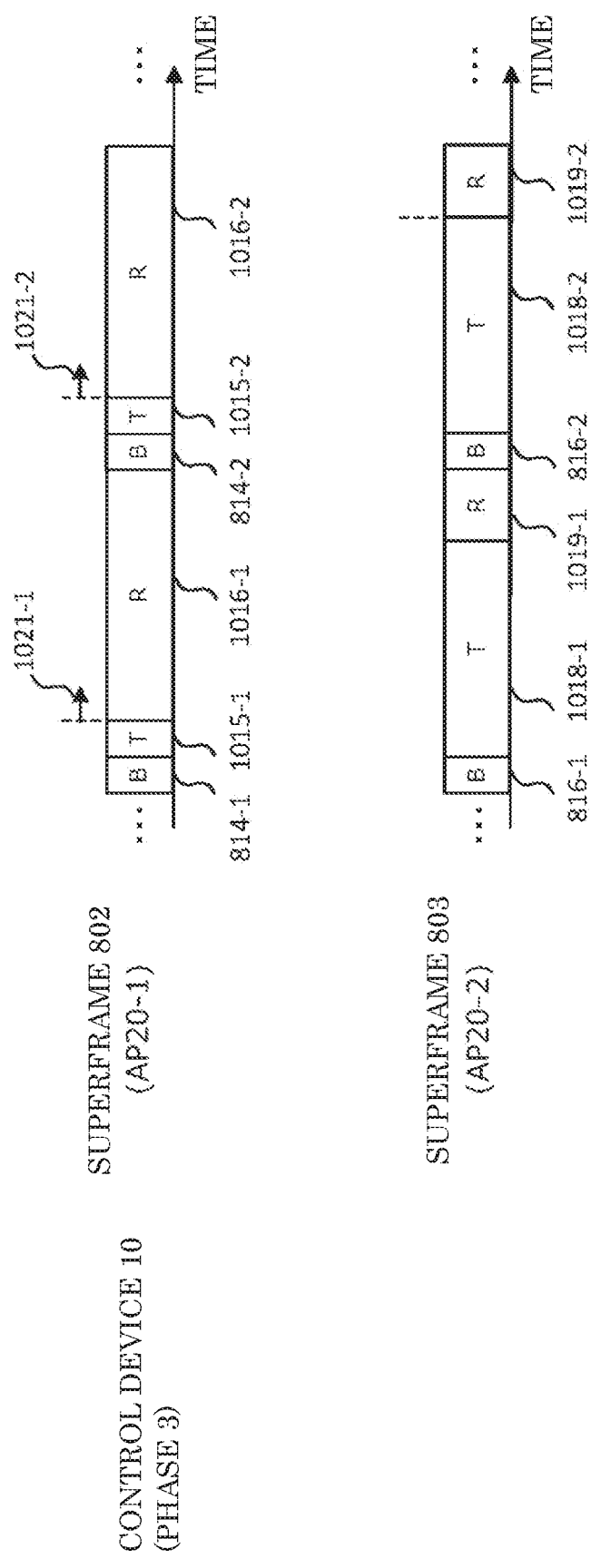
FIG. 12B is a diagram showing one example of the channel setting processing according to the exemplary embodiment.

When the number of accommodated slave units of AP 20 is greater than threshold #2 (Yes in S704), scheduler 202 performs arrows 1021-1 and 1021-2 in FIG. 12B as third resource allocation change control #3, and data channel period T of AP 20-1 is extended (S707).

FIG. 12B shows one example of the time resource allocation of AP 20-1 and AP 20-2 in third resource allocation change control #3. FIG. 12B shows an example in which scheduler 202 of AP 20-1 and AP 20-2 performs third resource allocation change control #3 (arrows 1021-1, 1021-2).

In third resource allocation change control #3, for example, when data channel resource that can be allocated to new slave unit 30 in one AP 20-2 is insufficient, the data channel resource of another AP 20-1 is extended (arrows 1021-1 and 1021-2) and allocated to new slave unit 30. "New slave unit 30" is, for example, slave unit 30 that has newly transmitted the connection request.

On the other hand, scheduler 202 of AP 20-1 allocates, for example, a part of control channel periods R (815-1 and 815-2; see FIG. 11) to data channel periods T (1015-1 and 1015-2) (arrows 1021-1, 1021-2).

In other words, control channel periods R (1016-1 and 1016-2) is reduced in superframe 802. As control channel periods R are reduced, data channel periods T (1015-1 and 1015-2) are set (extended) as indicated by arrows 1021-1 and 1021-2.

After completion of time resource allocation change control #3, scheduler 202, for example, determines whether the accommodation of all slave units 30 has ended in S708 of FIG. 9.

Upon determination that the accommodation of all slave units 30 is completed (Yes in S708), scheduler 202 may end the processing.

When the accommodation of all slave units 30 is not completed (No in S708), scheduler 202 determines whether the increase in the number of accommodated slave units is greater than threshold #4 (S709). Threshold #4 may be set to, for example, the number of slave units sharing a unit period in which each AP 20 extends or reduces data channel periods T. Every time the number of accommodated slave units increases by a predetermined number (threshold #4), data channel periods T of control channel priority AP 20-1 are further extended.

When the increase in the number of accommodated slave units is greater than threshold #4 (Yes in S709), scheduler 202 further extends data channel periods T (1015-1, 1015-2) in FIG. 12B as fourth resource allocation change control #4 (S710).

For example, scheduler 202 of AP 20-2 reduces control channel periods R, and extends data channel periods T in accordance with the reduction of control channel periods R in superframe 802 in the same manner as in FIG. 12B.

When fourth resource allocation change control #4 is completed, and when the increase in the number of accommodated slave units is smaller than or equal to threshold #4 (No in S709), scheduler 202 may return the processing to S708. For example, until the accommodation of all slave units 30 is completed (until it is determined as Yes in S708), scheduler 202 of AP 20-2 reduces control channel periods R and extends data channel periods T stepwise in superframe 802.

Figure 13:
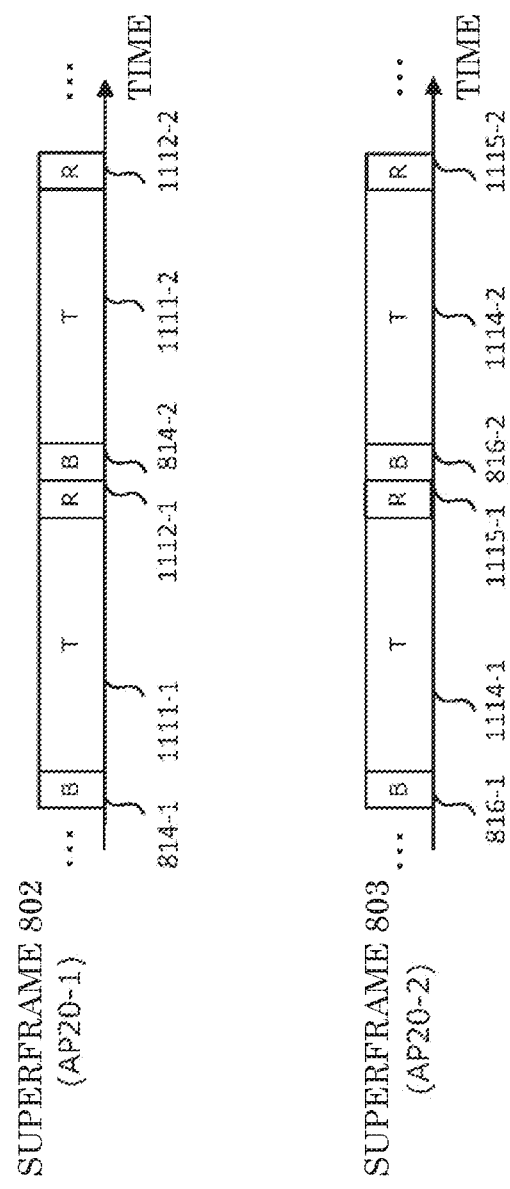
FIG. 13 is a diagram for explaining the channel setting processing according to the exemplary embodiment.

When the accommodation of all slave units 30 is completed (Yes in S708), scheduler 202 may end the processing. FIG. 13 shows one example of the time resource allocation in AP 20-1 and AP 20-2 when accommodation of all slave units 30 is completed.

As illustrated in FIG. 13, in superframe 802 managed by AP 20-1, for example, data channel periods T (1111-1 and 1111-2) are allocated, leaving control channel periods R (1112-1 and 1112-2).

Similarly, in superframe 803 managed by the AP 20-2, for example, data channel periods T (1114-1 and 1114-2) are allocated, leaving control channel periods R (1115-1 and 1115-2).

Note that control channel periods R (1112-1 and 1112-2) in superframe 802 and control channel periods R (1115-1 and 1115-2) in superframe 803 are, for example, used for reconnection of slave unit 30.

When control channel periods R for reconnection do not have to be secured in one or both of superframes 802 and 803, control channel periods R may be entirely allocated to data channel period of slave unit 30. Note that, for example, because AP 20 that does not set a control channel for reconnection may be present, there may be a case where control channel periods R for reconnection do not have to be secured.

Example of Extending Unit of Data Channel Period

A unit for extending or reducing data channel period T described above may be a unit of a resource block. The resource block may be set, for example, to correspond to time required for a round trip of the communication of the connection request and the connection response between AP 20 and slave unit 30. Further, the resource block may be set in the data channel so as to correspond to time required for packet transmission of slave unit which has acquired the transmission right by polling.

The number of salve units that can share one resource block can be estimated by dividing the number of slave units that the AP 20 can accommodate by the number of resource blocks allocated to the data channel. The estimated number of slave units may be set to threshold #3 (see S705 in FIG. 9) or threshold value #4 (see S709 in FIG. 9) described above.

As described above, scheduler 202 may allocate the time resources to the data channel in resource block units every time the increase in the number of accommodated slave units of AP 20 exceeds threshold #3 or threshold #4.

In this way, by allocating the time resources stepwise to the data channel in units of resource blocks in accordance with the number of accommodated slave units of AP 20, it is possible to shorten the time until the communication between AP 20 and slave unit 30 is started compared with the case where all the time resources that can be allocated to the data channel are allocated to the data channel at once.

Example of Setting Operation Mode with Three or More APs

In the above description, one control channel priority AP 20-1 and one data channel priority AP 20-2 have been described as an example, but a case where there are three or more APs will be described.

For example, when a venue for performance is large, there are APs that can be connected and APs that are difficult to connect by each slave unit 30, and there are more APs that can be connected than APs that are difficult to connect, it is possible to suppress the occurrence of data communication errors after connection processing by installing multiple data channel priority APs 20 of all APs 20.

Further, when the number of APs that are difficult to connect is extremely small, for example, less than or equal to 5%, by increasing the number of control channel priority APs 20 installed, a proportion of control channel periods that can be allocated increases, and the collision of the connection requests from slave units 30 can be reduced.

Thus, as an initial state, the number of data channel priority APs 20 and the number of control channel priority APs 20 are set to about half of all APs 20, respectively, and the number of data channel priority APs 20 and the number of control channel priority APs 20 are adjusted in accordance with the congestion degree of the connection requests and a communication state of each slave unit 30. Then, the control channel period can be allocated appropriately.

Comparative Example

Figure 14:
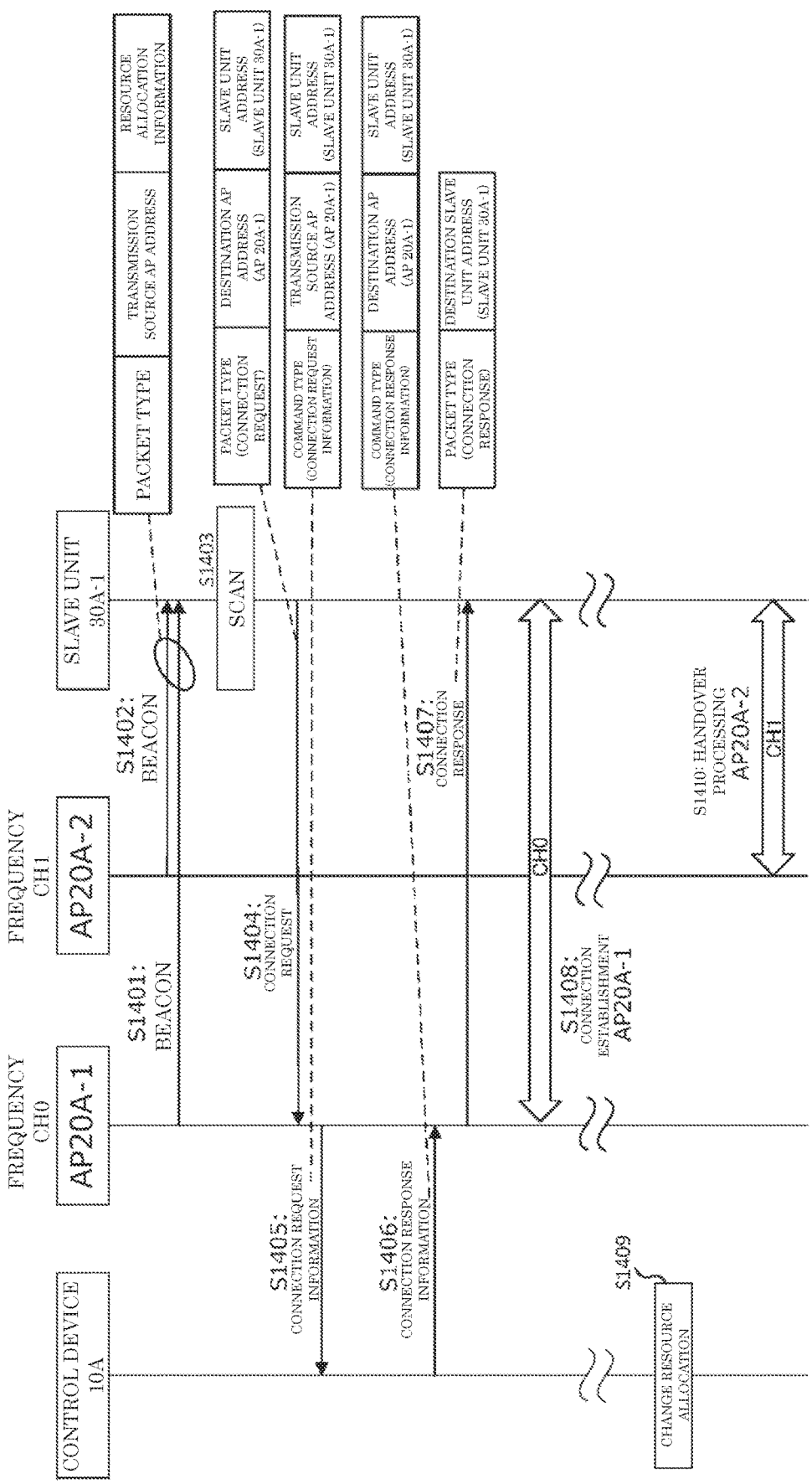
FIG. 14 is a sequence diagram for explaining a comparative example with respect to the exemplary embodiment.

Next, a comparative example with respect to the above exemplary embodiment will be described with reference to FIG. 14. FIG. 14 is a sequence diagram when control device 10 does not include the connection destination AP in connection destination AP information C518 in the connection sequence shown in FIG. 7. Superframes 800 and 801 in FIGS. 10A and 12A correspond to this case.

In FIG. 14, AP 20A-1 and AP 20A-2 respectively transmit beacons, for example, periodically on used frequency channels CH0 and CH1 (S1401 and S1402). For the beacon, for example, the "packet type", "transmission source AP address", and "resource allocation information" identified as a beacon are set.

When the beacon transmitted by AP 20A-1 and AP 20A-2 by scan of S1403 is received, slave unit 30A-1 transmits the connection request to the transmission source of the beacon having good reception power, for example, AP 20A-1 on frequency channel CH0 (S1404).

The connection request to AP 20A-1 is transmitted, for example, in the control channel period identified based on the resource allocation information of the beacon received from AP 20A-1. In the connection request, the connection request is set in the "packet type", the "destination AP address" is set to an address of AP 20A-1, and the "transmission source address" (slave unit address) is set to an address of slave unit 30A-1.

When the connection request transmitted by slave unit 30A-1 is received on frequency channel CH0, AP 20A-1 transmits, for example, the connection request information included in the received connection request to control device 10A (S1405).

In the connection request information, the connection request information is set to the "command type", the address of AP 20A-1 is set to the "transmission source AP address", and the address of slave unit 30A-1 as the transmission source of the connection request is set to the "slave unit address".

Control device 10A receives the connection request information from AP 20A-1, and when slave unit 30A-1 is allowed to connect to AP 20A-1, control device 10A, for example, generates the connection response information and transmits the information to AP 20A-1 (S1406). In the connection response information, the connection response information is set to the "command type", the address of AP 20A-1 is set to the "destination AP address", and the address of slave unit 30A-1 as the transmission source of the connection request is set to the "slave unit address".

When AP 20A-1 receives the connection response information from control device 10A, AP 20-1 generates the connection response addressed to slave unit 30A-1 that has transmitted the connection request, and transmits the connection response addressed to slave unit 30A-1 on frequency channel CH0 (S1407). In the connection response, the connection response is set to the "packet type", and the address of slave unit 30A-1 as the transmission source of the connection request is set to the "destination (slave unit) address".

When slave unit 30A-1 receives the connection response from AP 20A-1, the connection of frequency channel CH0 is established between slave unit 30A-1 and AP 20A-1 (S1408).

After that, for example, when the number of connection requests received by AP 20A-1 (in other words, a control communication amount related to the connection processing) increases, control device 10A, for example, extends the control channel period in AP 20A-1 (S1409).

FIGS. 10A and 12A show one example of resource allocation change in the comparative example. FIGS. 10A and 12A show the comparative example with respect to FIGS. 10B and 12B of the exemplary embodiment, respectively.

In FIG. 10A, AP 20A-1 and AP 20A-2 manage superframes 800 and 801, respectively. In the initial state, unlike the example of the allocation in FIG. 10B, both control channel periods R and data channel periods T are allocated to each of superframes 800 and 801.

For example, beacon transmission periods B (804-1 and 804-2), data channel periods T (805-1 and 805-2), and control channel periods R (806-1 and 806-2) are allocated to superframe 800 managed by AP 20A-1.

For example, beacon transmission periods B (807-1 and 807-2), data channel periods T (808-1 and 808-2), and control channel periods R (809-1 and 809-2) are allocated to superframe 801 managed by AP 20A-2.

When the number of connection requests to AP 20A-1 increases, control device 10A extends control channel periods R (806-1 and 806-2), for example, in superframe 800 as shown by arrows 810-1 and 810-2. As control channel periods R are extended, data channel periods T (805-1 and 805-2) are reduced.

The reduction in data channel periods T may cause the slave unit (for example, slave unit 30A-1) in which the allocation of the data channel periods by AP 20A-1 is lost. For example, in slave unit 30A-1 to which data channel periods 812-1 and 812-2 have been allocated for communication with AP 20A-1, the allocation of the data channel is lost due to the reduction of data channel periods T.

Thus, control device 10A allocates, for example, the data channel to be allocated to slave unit 30A-1 to superframe 801 managed by another AP 20-2. For example, control device 10A extends data channel periods T (808-1 and 808-2) in superframe 801 from the initial allocation (see arrows 811-1 and 811-2).

Control device 10A allocates the time resources corresponding to data channel periods 812-1 and 812-2 in superframe 800 to extended data channel periods T (see dotted arrows 813-1 and 813-2).

In this case, the connection destination AP of slave unit 30A-1 is changed from AP 20A-1 to AP 20A-2. In order to change the connection destination AP of slave unit 30A-1 to AP 20A-2, the handover processing is performed between AP 20A-1 and AP 20A-2 and slave unit 30A-1 (S1410 in FIG. 14).

FIG. 12A shows an example in which, contrary to FIG. 10A, control channel periods R of superframe 801 are extended (data channel periods T are reduced), and control channel periods R of superframe 800 are reduced (data channel periods T are extended).

For example, as shown in FIG. 10A, the resource allocation change in FIG. 12A is performed when the number of connection requests received by the AP 20A-1 decreases after a part of data channel periods T of superframe 800 is allocated to the extension period of data channel periods T of superframe 801.

For example, control device 10A extends data channel periods T (1005-1 and 1005-2) and reduces control channel periods R (1006-1 and 1006-2) in superframe 800.

Further, control device 10A reduces data channel periods T (1008-1 and 1008-2) and extends control channel periods R (1009-1 and 1009-2) (see arrows 1011-1 and 1011-2) in superframe 801.

Due to the reduction of data channel periods T in superframe 801, data channel periods T extended in superframe 800 are allocated to the slave unit (for example, slave unit 30A-1) in which data channel allocation is lost (dotted arrows 1013-1 and 1013-2).

In this case, the connection destination AP of slave unit 30A-1 is changed from AP 20A-2 to AP 20A-1. Thus, the handover processing is performed between AP 20A-2 and AP 20A-1 and slave unit 30A-1 (S1410 in FIG. 14).

As described above, in the comparative example, the control channel period and the data channel period are allocated to superframes 800 and 801 managed by APs 20A-1 and 20A-2, respectively.

When the control channel resource managed by one of AP 20A-1 or AP 20A-2 is increased (the data channel resource is decreased) in accordance with the increase or decrease in the number of connection requests, control device 10A extends the data channel resource managed by the other AP 20 and allocates the data channel resource to slave unit 30A-1 in which data channel allocation is lost.

The data channel resources of different management source APs are allocated to slave unit 30A-1, and thus control device 10A changes the connection destination of slave unit 30A-1 to an appropriate AP before and after the data channel resource allocation change. That is, slave unit 30A-1 is handed over between different APs.

In the control channel period, when multiple slave units 30 transmit and receive a connection request and a connection response to and from the AP by CSMA/CA, the intervention of the handover processing causes signal collision and/or loss of transmission opportunity, which is inefficient.

On the other hand, in the above exemplary embodiment, for example, as shown in FIGS. 7, 10B, and 12B, occurrence of handover processing accompanying the resource allocation change control in the control channel period and the data channel period can be avoided.

The following is the reason why the occurrence of handover processing can be avoided in the resource allocation change control according to the present exemplary embodiment.

For example, control device 10 determines connection destination AP 20 of slave unit 30 that newly requests the connection to AP 20, based on the number of accommodated slave units of each AP 20. For example, control device 10 extends stepwise the data channel period managed by AP 20 in accordance with the increase in the number of accommodated slave units of AP 20 in the scheduling of the time resource.

Control device 10 determines (or designates) AP 20 that extends the data channel as connection destination AP 20 of slave unit 30, and notifies slave unit 30 that has transmitted the connection request of the information on determined connection destination AP 20, for example, by a connection response.

Thus, slave unit 30 is informed of the information on AP 20 whose data channel is extended in the connection processing sequence with AP 20, in other words, before the connection with AP 20 is established. Slave unit 30 does not have to change connection destination AP 20 in accordance with the resource allocation change control after the connection is established by establishing the connection with designated AP 20 in which the data channel is extended.

Thus, for example, the occurrence of handover processing S1410 in FIG. 14 can be avoided. As a result, the connection processing of slave unit 30 to AP 20 can be efficiently performed. In this way, it is possible to avoid a decrease in the throughput of data communication due to the control communication related to the handover processing, and improve the quality of the mass performance by slave unit 30, for example.

In the comparative example in FIG. 14, the connection destination AP of slave unit 30A-1 is determined by the determination based on a scan result of slave unit 30A-1, and thus handover processing S1410 occurs after the connection is established depending on the number of accommodated slave units.

FIG. 15 shows a difference between control device 10 in FIG. 7 and control device 10A in FIG. 14 in comparison. As shown in FIG. 15, the number of slave units assumed in control device 10A is about several tens to several hundreds, whereas the number of slave units assumed in control device 10 is, for example, about several thousands to tens of thousands because the slave units are used for the mass performance.

Further, the initial allocation of the time resource in the AP includes both the control channel and the data channel in control device 10A, whereas control device 10 includes the control channel, and may not include the data channel.

Regarding the connection processing between slave unit and AP, slave unit 30A-1 in FIG. 14 establishes a connection with the transmission destination AP of the connection request, whereas slave unit 30-1 in FIG. 7 establishes a connection with the AP designated by control device 10.

When the resource allocation managed by each AP is changed, the handover processing may occur in slave unit 30A-1 in FIG. 14, whereas the occurrence of handover processing can be avoided in slave unit 30-1 in FIG. 7 as described above.

From the above, according to the present exemplary embodiment, when the beacon transmitted by AP 20 by scanning is received, slave unit 30 determines transmission destination AP 20 of the connection request, for example, based on the band allocation information to the control channel of AP 20 included in the received beacon. In determining the transmission destination AP of the connection request by slave unit 30, for example, by selecting AP 20 having a long control channel period with a high probability and selecting AP 20 having a short control channel period with a low probability, collision of connection request C516 can be mitigated and the time to establish a connection with AP 20 can be reduced.

Further, by including the connection destination AP information in the connection response transmitted by AP 20-1, slave unit 30 is aware of AP 20 in which data channel periods T are extended before a connection with AP 20 is established. It is therefore possible to avoid the handover processing that occurs when data channel periods T are reduced.

As a result, the wireless system according to the present exemplary embodiment can suppress the control communication related to the handover processing and suppress a decrease in the throughput of data communication.

Others

Note that the beacon transmitted by AP 20 (for example, S5503 and S504 in FIG. 7) may include priority information regarding the connection destination AP.

The priority information may be designated by, for example, slave unit connection processing unit 203 of AP 20. Upon determination of the connection destination AP, slave unit 30 may select the AP having a high priority as the connection destination based on the priority information.

Further, each functional block used in the description of the above exemplary embodiment is typically achieved as a large-scale integration (LSI) which is an integrated circuit. The integrated circuit may control each of the functional blocks used in the description of the above exemplary embodiment and may include an input and an output. The integrated circuit may be individually made into one chip, or may be made into one chip so as to include a part or all of the functional blocks. The LSI referred herein may also be called IC, system LSI, super LSI, or ultra LSI depending on a degree of integration.

Further, a method of circuit integration is not limited to the LSI, and may be achieved using a dedicated circuit or a general-purpose processor. A field programmable gate array (FPGA) that can be programmed after the LSI is manufactured, or a reconfigurable processor whose connection and settings of circuit cells inside the LSI can be reconfigured may be used.

Furthermore, if integrated circuit technology appears to replace the LSI as a result of the advanced semiconductor technology or derivative another technology, functional blocks may well be integrated using another technology. An application of biotechnology or the like is possible.

Note that the present disclosure can be expressed as a control method performed by a wireless communication device or a control device. Further, the present disclosure can be expressed as a program that causes a computer to operate the control method. Furthermore, the present disclosure can be expressed as a recording medium that records the program in a computer-readable state. That is, the present disclosure can be expressed in any category of an apparatus, a method, a program, or a recording medium.

SUMMARY OF THE PRESENT DISCLOSURE

A wireless communication system according to the present disclosure includes: a first access point and a second access point each having a superframe in an initial state in which a control channel period is longer than a data channel period; one or more terminal devices, at least one of the one or more terminal devices transmitting a connection request to the first access point in order to connect with one of the first access point or the second access point by a wireless link; and a control device that performs control to cause the first access point to transmit, as a connection response, information indicating the second access point as information on a connection destination access point to the at least one of the one or more terminal devices that has transmitted the connection request.

In the wireless communication system according to the present disclosure, the control device performs control in which resource allocation information indicating allocation of control channel periods and data channel periods of each of the first access point and the second access point is transmitted from each of the first access point and the second access point to the one or more terminal devices.

Further, in the wireless communication system according to the present disclosure, the one or more terminal devices each selects an access point to which the connection request is transmitted based on the resource allocation information.

Further, in the wireless communication system according to the present disclosure, the first access point and the second access point use different frequencies for connection with the one or more terminal devices.

In the wireless communication system according to the present disclosure, the control device transmits the connection response to the at least one of the one or more terminal devices that has transmitted the connection request, and then reduces the control channel period and extends the data channel period in the wireless link managed by the second access point.

Further, a control device according to the present disclosure includes: reception circuitry that receives, from a first access point, information on a connection request that one or more terminal devices have transmitted to the first access point in order to connect, by a wireless link, one of the first access point or a second access point each having a superframe in an initial state in which a control channel period is longer than a data channel period; and control circuitry that performs control in which information indicating the second access point as information on a connection destination access point is transmitted as a connection response from the first access point to the one or more terminal devices that have transmitted the connection request.

Further, a first access point, the first access point being among a plurality of access points including a second access point, the first access point includes: first transmission circuitry that transmits, to the control device, information on a connection request that one or more terminal devices have transmitted to the first access point in order to connect, by a wireless link, one of the first access point or the second access point each having a superframe in an initial state in which a control channel period is longer than a data channel period; and second transmission circuitry that transmits, as a connection response, information indicating the second access point as information on a connection destination access point to the one or more terminal devices that have transmitted the connection request.

Further, a terminal device according to the present disclosure includes: transmission circuitry that transmits a connection request to a first access point in order to connect, by a wireless link, to one of the first access point or a second access point each having a superframe in an initial state in which a control channel period is longer than a data channel period; and reception circuitry that receives, as a connection response, information indicating the second access point as information on a connection destination access point from the first access point after the connection request is transmitted.

The present disclosure is suitable for, for example, a wireless communication system that provides a performance using a wireless control compatible light-emitting device as a terminal device.

What is claimed is:

1. A wireless communication system comprising:
   a first access point and a second access point, the first access point having a first superframe in an initial state in which a first control channel period is longer than a first data channel period, and the second access point having a second superframe in an initial state in which a second control channel period is longer than a second data channel period;
   one or more terminal devices, at least one of the one or more terminal devices transmitting a connection request to the first access point in order to connect with one of the first access point by a first wireless link or the second access point by a second wireless link; and
   a control device that performs control to cause the first access point to transmit, as a connection response, information indicating the second access point as information on a connection destination access point to the at least one of the one or more terminal devices that has transmitted the connection request,
   wherein the control device transmits the connection response to the at least one of the one or more terminal devices that has transmitted the connection request, and subsequently reduces the second control channel period and extends the second data channel period in the second wireless link managed by the second access point.

2. The wireless communication system according to claim 1, wherein the control device performs control in which resource allocation information indicating allocation of the first control channel period and the first data channel period of the first access point and the second control channel period and the second data channel period of the second access point is transmitted from the each of the first access point and the second access point to the one or more terminal devices.

3. The wireless communication system according to claim 2, wherein the one or more terminal devices each selects an access point to which the connection request is transmitted based on the resource allocation information.

4. The wireless communication system according to claim 1, wherein the first access point and the second access point use different frequencies for connection with the one or more terminal devices.

5. The wireless communication system according to claim 1, wherein the control device performs control to reduce the second control channel period and extend the second data channel period in the second wireless link managed by the second access point according to a number of the one or more terminal devices that have transmitted the connection request.

6. The wireless communication system according to claim 1, wherein an initial state of the first wireless link managed by the first access point does not include the first data channel period.

7. The wireless communication system according to claim 1, wherein the first wireless link managed by the first access point accommodates a predetermined number of the one or more terminal devices that have transmitted a connection request to the second wireless link managed by the second access point, and then reduces the first control channel period and extends the first data channel period.

8. A control device comprising:
   reception circuitry that receives, from a first access point, information on a connection request that one or more terminal devices transmitted to the first access point in order to connect by a first wireless link with the first access point or by a second wireless link with a second access point, the first access point having a first superframe in an initial state in which a first control channel period is longer than a first data channel period, and the second access point having a second superframe in an initial state in which a second control channel period is longer than a second data channel period; and
   control circuitry that performs control in which information indicating the second access point as information on a connection destination access point is transmitted as a connection response from the first access point to the one or more terminal devices that transmitted the connection request,
   wherein the control circuitry transmits the connection response to at least one of the one or more terminal devices that transmitted the connection request, and subsequently reduces the second control channel period and extends the second data channel period in the second wireless link managed by the second access point.

9. A first access point, the first access point being among a plurality of access points including a second access point, the first access point comprising:
 first transmission circuitry that transmits, to a control device, information on a connection request that one or more terminal devices have transmitted to the first access point in order to connect by a first wireless link to the first access point having a first superframe in an initial state in which a first control channel period is longer than a first data channel period; and
 second transmission circuitry that transmits, as a connection response, information indicating the second access point as information on a connection destination access point to the one or more terminal devices that have transmitted the connection request,
 wherein the second transmission circuitry transmits the connection response to at least one of the one or more terminal devices that has transmitted the connection request, and subsequently the second access point reduces a second control channel period and extends a second data channel period in a second wireless link managed by the second access point.

10. A terminal device comprising:
 transmission circuitry that transmits a connection request to a first access point in order to connect by a first wireless link with the first access point having a first superframe in an initial state in which a first control channel period is longer than a first data channel period; and
 reception circuitry that receives, as a connection response, information indicating a second access point as information on a connection destination access point from the first access point after the connection request is transmitted,
 wherein the second access point has a second superframe having a reduced second control channel period and an extended second data channel period.

* * * * *